United States Patent
Panchal et al.

(10) Patent No.: US 11,739,112 B2
(45) Date of Patent: Aug. 29, 2023

(54) LOW TEMPERATURE PROCESS FOR THE SYNTHESIS OF MOF CARBOXYLATE NANOPARTICLES

(71) Applicants: CENTRE NATIONAL DE LA RECHERCHE SCIENTIFIQUE, Paris (FR); UNIVERSITÉ DE VERSAILLES—SAINT-QUENTIN-EN-YVELINES, Versailles (FR)

(72) Inventors: Monik Panchal, Lancashire (GB); Farid Nouar, Saint-Cyr-l'Ecole (FR); Christian Serre, Plaisir (FR); Marvin Benzaqui, Paris (FR); Saad Sene, Vélizy-Villacoublay (FR); Nathalie Steunou, Frémécourt (FR); Monica Giménez Marqués, Arcueil (FR)

(73) Assignees: CENTRE NATIONAL DE LA RECHERCHE SCIENTIFIQUE, Paris (FR); UNIVERSITÉ DE VERSAILLES—SAINT-QUENTIN-EN-YVELINES, Versailles (FR)

( * ) Notice: Subject to any disclaimer, the term of this patent is extended or adjusted under 35 U.S.C. 154(b) by 161 days.

(21) Appl. No.: 17/242,579

(22) Filed: Apr. 28, 2021

(65) Prior Publication Data
US 2021/0277042 A1 Sep. 9, 2021

Related U.S. Application Data

(62) Division of application No. 16/480,531, filed as application No. PCT/EP2018/052115 on Jan. 29, 2018, now Pat. No. 11,034,711.

(30) Foreign Application Priority Data

Feb. 2, 2017 (EP) .................................... 17305119

(51) Int. Cl.
C07F 15/02 (2006.01)
C07F 5/06 (2006.01)
C07F 7/00 (2006.01)
B82Y 40/00 (2011.01)

(52) U.S. Cl.
CPC ............ C07F 15/025 (2013.01); C07F 5/069 (2013.01); C07F 7/003 (2013.01); B82Y 40/00 (2013.01)

(58) Field of Classification Search
CPC ........ C07F 15/025; C07F 7/003; C07F 5/069; B82Y 40/00
See application file for complete search history.

(56) References Cited

U.S. PATENT DOCUMENTS

2015/0150981 A1‡ 6/2015 Gref ...................... A61K 47/24
514/777
2020/0102337 A1 4/2020 Panchal et al.

OTHER PUBLICATIONS

Horcajada et al., Chem. Commun., (2007), p. 2820-2822.*
Bellido et al., Langmuir, (2014), v.30, p. 5911-5920.*
Horcajada et al., Angew. Chem. Int. Ed., (2006), v.45, p. 5974-5978.*
Simon-Yarza et al., International Journal of Pharmaceutics, (2016), v.511, p. 1042-1047.*
Kovacic et al., Macromol. Rapid Commun., (2015), v.36, p. 1605-1611.*
Dias et al., J. Mater.Chem. A, (2015), 3, 22484-22506.*
Garcia-Marquez et al., Eur. J. Inorg. Chem., (2012), p. 5165-5174.*
Jung Shi et al: "Synthesis of MIL-100 (Fe) at Low Temperature and Atmospheric Pressure", Journal of Chemistry, vol. 2013, Jan. 1, 2013, pp. 1-4, XP55363243.‡
International Search Report for corresponding application PCT/EP2018/052115 filed Jan. 29, 2018; Report dated Apr. 4, 2018.‡
Written Opinion for corresponding application PCT/EP2018/052115 filed Jan. 29, 2018; Report dated Apr. 4, 2018.‡
Manuel Sanchez-Sanchez et al: "Synthesis of Metal-Organic Frameworks in water at room temperature: salts as linker sources", Green Chemistry, vol. 17, No. 3, Jan. 1, 2015, pp. 1500-1509.‡
Fumin Zhang: "Facile synthesis of MIL-100 (Fe) under HF-free conditions and its application in the acetalization of aldehydes with diols", Chemical Engineering Journal, vol. 259, Aug. 8, 2014, pp. 183-190, XP55363246.‡
Zhang et al., Chemical Engineering Journal, (2015), v.259, p. 183-190 (disclosed in IDS).‡
Seo, You-Kyong, et al. "Large scale fluorine-free synthesis of hierarchically porous iron(III) trimesateMIL-100(Fe) with a zeolite MTN topology," Microporous and Mesoporous Materials 157 (2012) 137-145.

* cited by examiner
‡ imported from a related application

Primary Examiner — Yong L Chu
(74) Attorney, Agent, or Firm — Cantor Colburn LLP

(57) ABSTRACT

The present invention relates to low temperature process for preparing nanoparticles of porous crystalline Fe-, Al- or Ti-based MOF carboxylate materials with low polydispersity index, and uses thereof, particularly as catalyst support for carrying out heterogeneously catalyzed chemical reactions, or as gas storage/separation/purification material, or as matrix for encapsulating active principles (medicine, cosmetics).

20 Claims, 24 Drawing Sheets

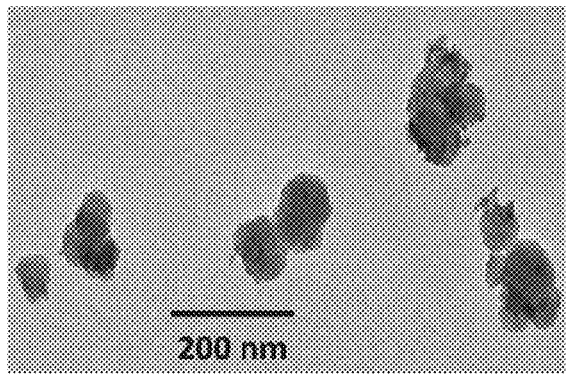
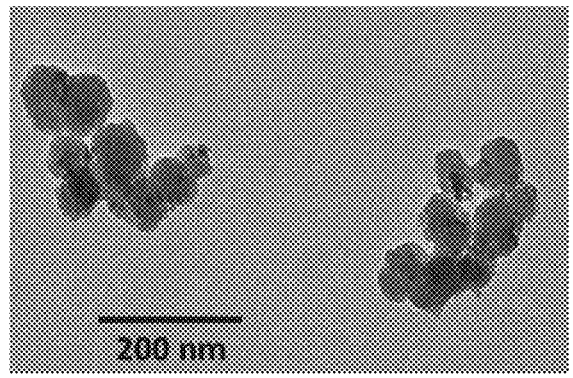
FIG. 21A　　　　　　　　　　　FIG. 21B
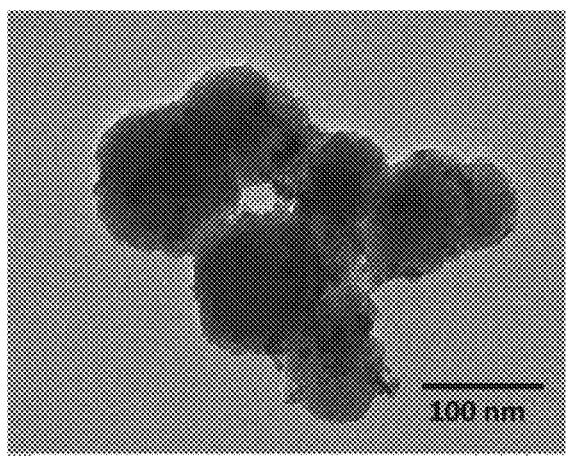
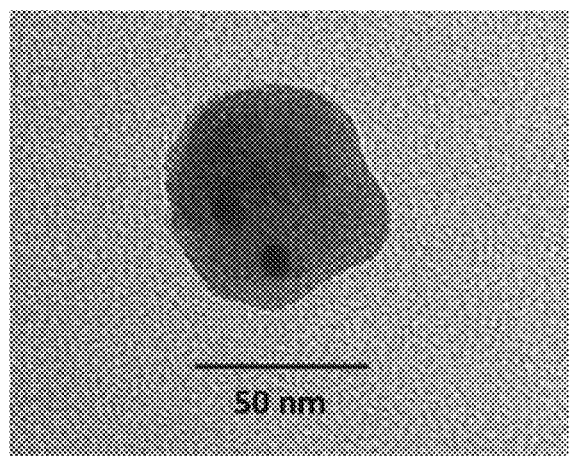
FIG. 21C　　　　　　　　　　　FIG. 21D
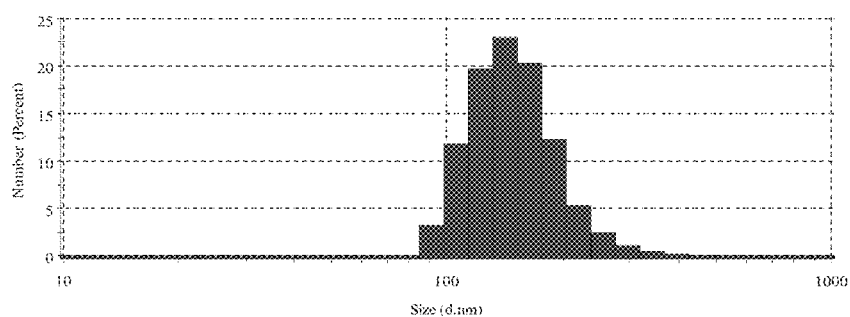
FIG. 22

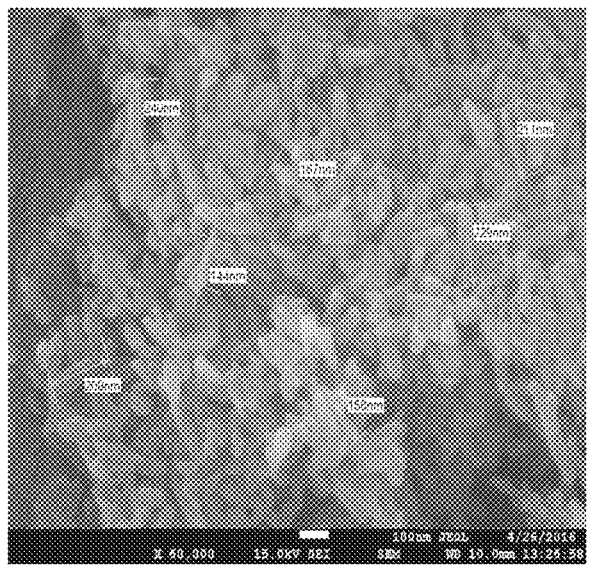 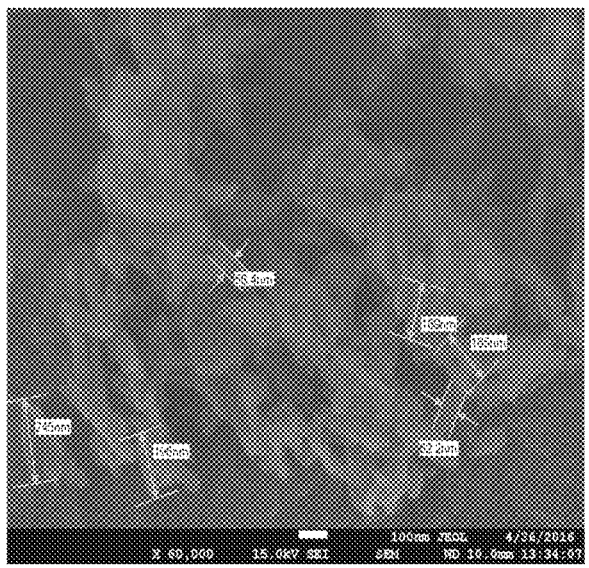
FIG. 31A  FIG. 31B
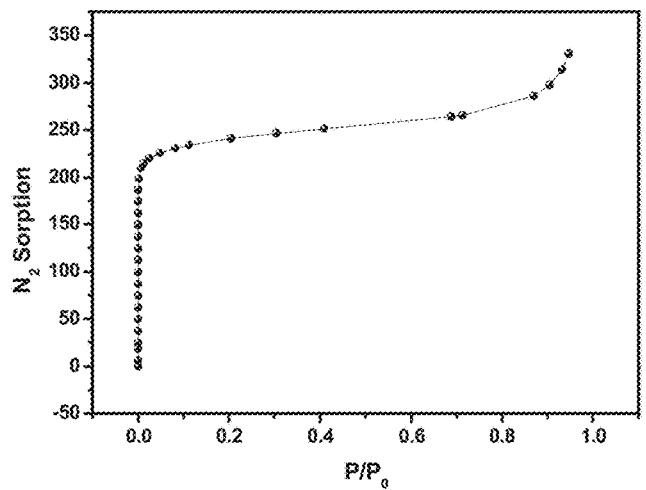
FIG. 32

LOW TEMPERATURE PROCESS FOR THE SYNTHESIS OF MOF CARBOXYLATE NANOPARTICLES

PRIORITY

This application is a divisional application of U.S. patent application Ser. No. 16/480,531, filed on Jul. 24, 2019, which is a 371 of PCT/EP2018/052115 filed Jan. 29, 2018, which claims priority to European Patent Application No. EP 17305119.4 filed on Feb. 29, 2017, all of which are incorporated by reference herein their entirety.

FIELD OF THE INVENTION

The present invention relates to low temperature process for preparing nanoparticles of porous crystalline Fe-, Al- or Ti-based MOF carboxylate materials with low polydispersity index, and uses thereof, particularly as catalyst support for carrying out heterogeneously catalyzed chemical reactions, or as gas storage/separation/purification material, or as matrix for encapsulating active principles (medicine, cosmetics).

BACKGROUND OF THE INVENTION

Metallo-organic lattices or metal-organic frameworks (MOFs) are porous coordination polymers, having an inorganic-organic hybrid framework that comprises metal ions and organic ligands coordinated to the metal ions. These materials are organized into one-, two- or three-dimensional lattices, in which the metallic species are joined together periodically by spacer ligands. The framework of these solids has both inorganic parts and organic parts, the cavities of which may be occupied by water molecules or by organic molecules that are easy to extract without deterioration of the backbone.

Another distinctive feature of certain hybrid solids is the existence of a flexibility of the lattice, greater than that encountered for purely inorganic phases. This is generally due to the use of flexible organic ligands (aliphatic chains), or to the shrinkage of the pores linked to the departure of molecules encapsulated within the pores.

These materials exhibit a crystalline structure, are usually porous and offer many potential industrial applications such as gas storage, adsorption of liquids, separation of liquids or gases, catalysis, controlled release of medicaments, etc.

However, MOF nanoparticles are difficult to synthesize, and especially nanoparticles smaller than 100 nm, given their nature to aggregate readily and given the tendency of these materials to organize in crystal lattices of large size (microns). In addition, current synthetic processes do not overcome or sufficiently address problems of non-uniformity of particle size (high polydispersity), which are unfavorable for certain applications; nor are they adapted for materials that are sensitive/fragile to the reaction conditions of the conventional processes for preparing MOF materials.

Therefore, there remains a need for the development of new synthetic processes which allow the preparation of MOF nanoparticles with low polydispersity index, in particular synthetic processes under mild conditions.

BRIEF DESCRIPTION OF THE DRAWINGS

FIGS. 21A, 21B, 21C, 21D show transmission electron microscopy (TEM) images of γ-$Fe_2O_3$@MIL-100(Fe) composites prepared according to Example 4. TEM observations were performed using a Zeiss EM902 Transmission Electron Microscope.

FIG. 22 shows a histogram representing the particle size distribution of γ-$Fe_2O_3$@MIL-100(Fe) NPs prepared in Example 4 analysed by DLS measurements. DLS measurements were performed with a zetasizer nano ZS using a suspension sample at 0.1 g/L with a pH 3.

FIGS. 31A, 31B show scanning electron microscopy (SEM) images of the new Fe/BTeC MOF prepared according to Example 6, showing needle-like particles with length between 100 and 250 nm and height and with around 50 nm.

FIG. 32 shows $N_2$ adsorption of the new Fe/BTeC MOF prepared according to Example 6 performed at 77K showing a type I isotherm.

Figure 1:
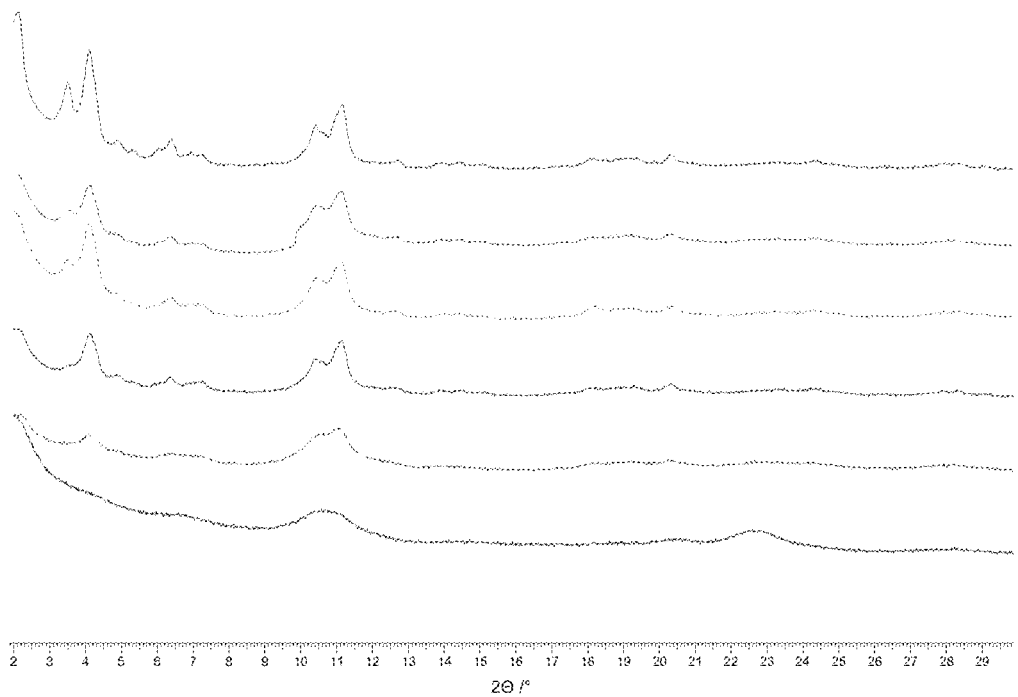
FIG. 1 shows powder X-ray diffraction (PXRD) patterns of samples of MIL-100(Fe) nanoparticles obtained in Example 1, taken from the reaction mixture after various reaction times (from bottom to top: 1 h, 2 h, 4 h, 6 h, 24 h and 48 h).
Figure 2A:
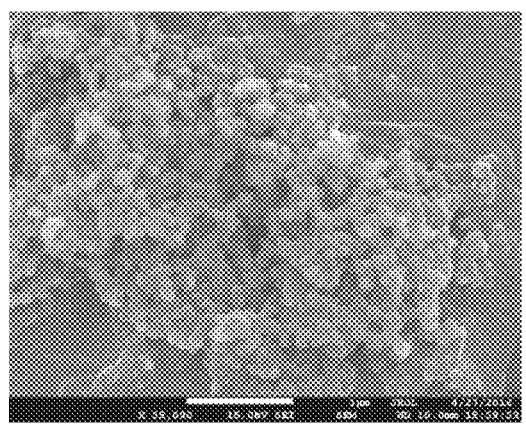
FIGS. 2A, 2B, 2C show scanning electron microscopy (SEM) images of MIL-100(Fe) nanoparticles obtained in Example 1.
Figure 2B:
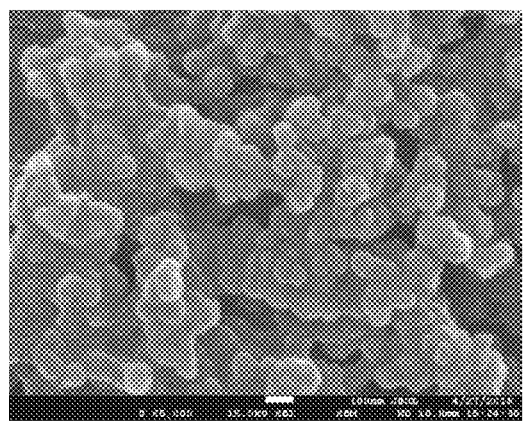
Figure 2C:
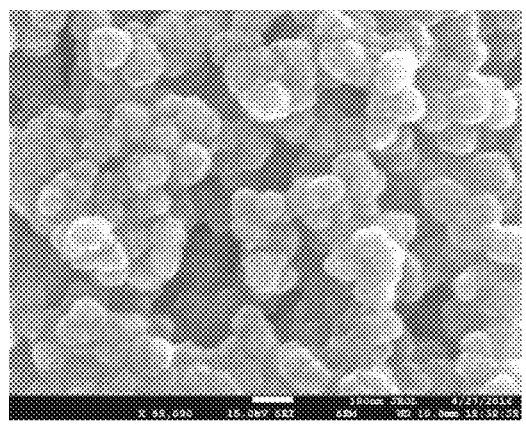
Figure 3:
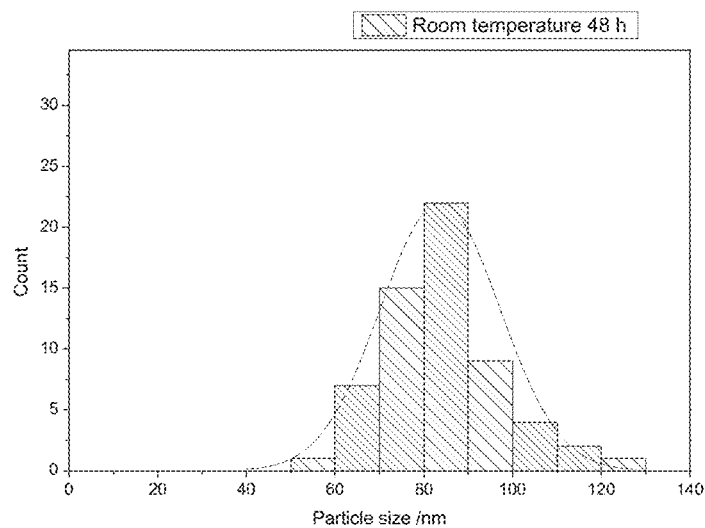
FIG. 3 shows a histogram representing the particle distribution of MIL-100(Fe) nanoparticles obtained in Example 1, using Image J software. The average particle size is 84 nm±13.
Figure 4:
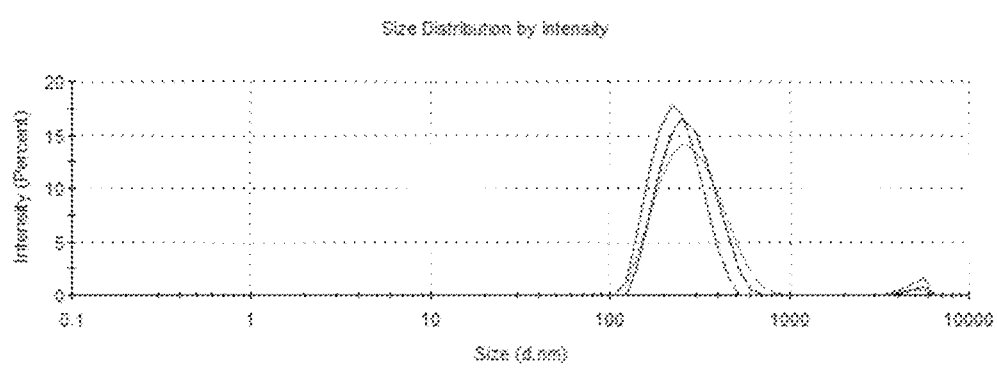
FIG. 4 shows three Dynamic Light Scattering (DLS) measurements conducted on MIL-100(Fe) nanoparticles obtained in Example 1, with an average hydrodynamic diameter of the principal peaks of 242 nm±72 and a polydispersibility index of 0.201.p
Figure 5:
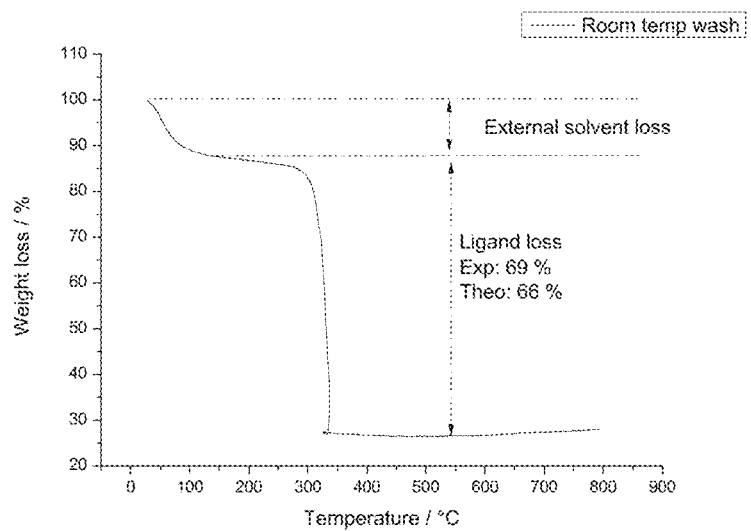
FIG. 5 shows a thermal gravimetric analysis plot of MIL-100(Fe) nanoparticles obtained in Example 1, conducted under oxygen atmosphere (heating rate of 5° C. per minute).
Figure 6:
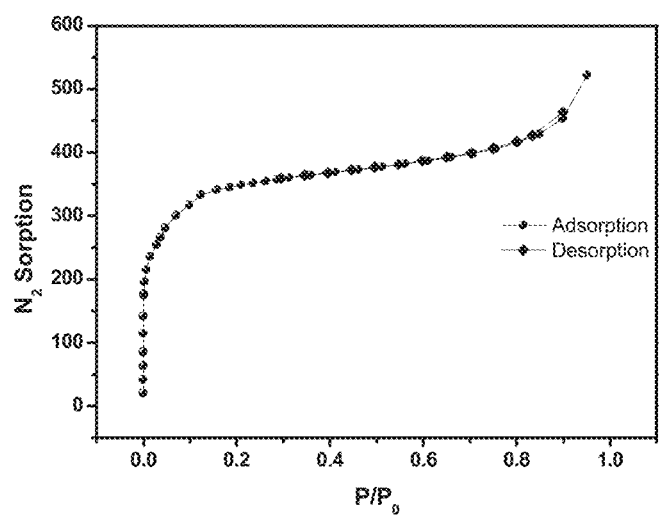
FIG. 6 shows $N_2$ adsorption (dots) and desorption (diamonds) isotherms obtained from MIL-100(Fe) nanoparticles obtained in Example 1 (Evacuated under primary vacuum at 150° C. for 15 h). The Surface area obtained is 1330 $m^2g^{-1}$ (evaluated using the BET model).
Figure 7:
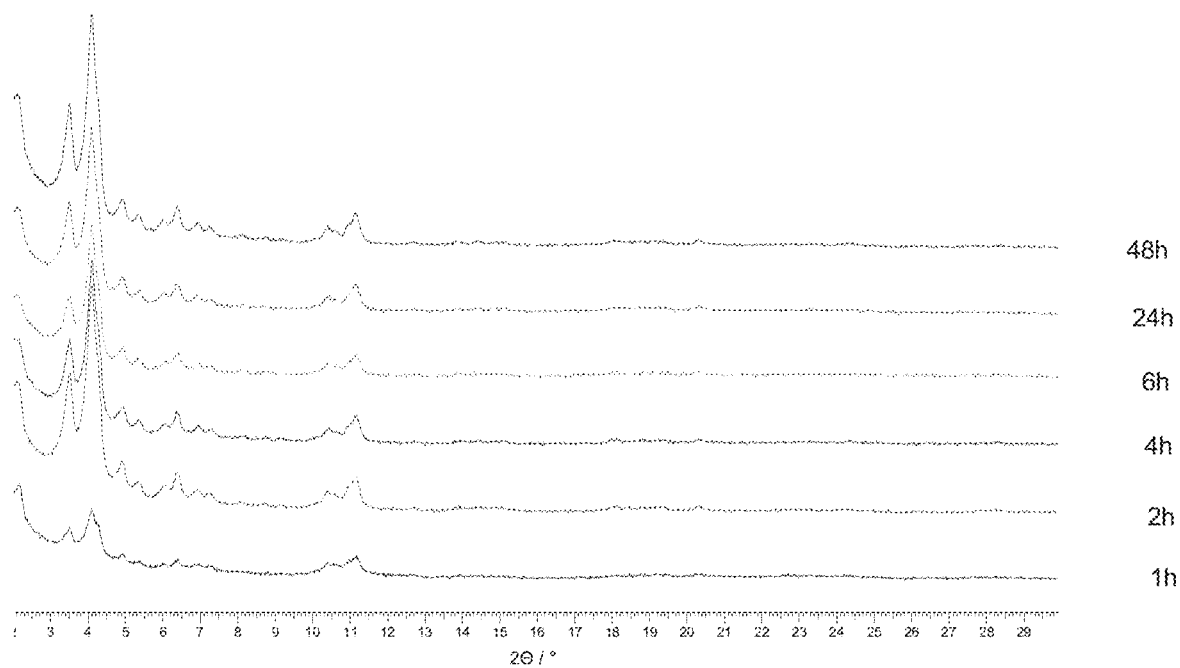
FIG. 7 shows powder X-ray diffraction (PXRD) patterns of samples of MIL-100(Fe) nanoparticles obtained in Example 2, taken from the reaction mixture after various reaction times (1 h, 2 h, 4 h, 6 h, 24 h and 48 h).
Figure 8A:
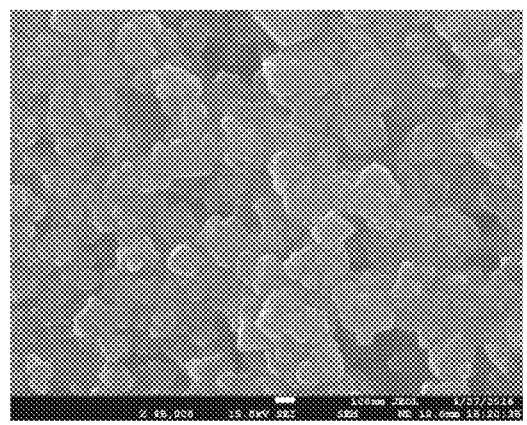
FIGS. 8A, 8B show scanning electron microscopy (SEM) images of MIL-100(Fe) nanoparticles obtained in Example 2.
Figure 8B:
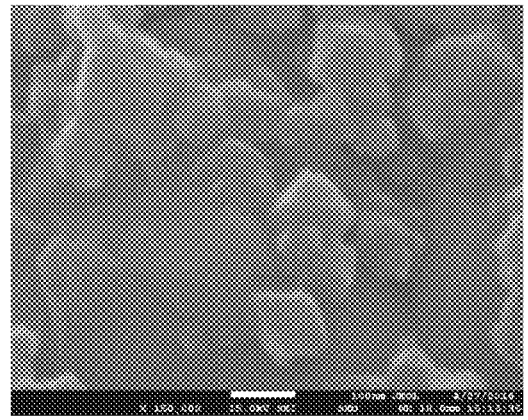
Figure 9:
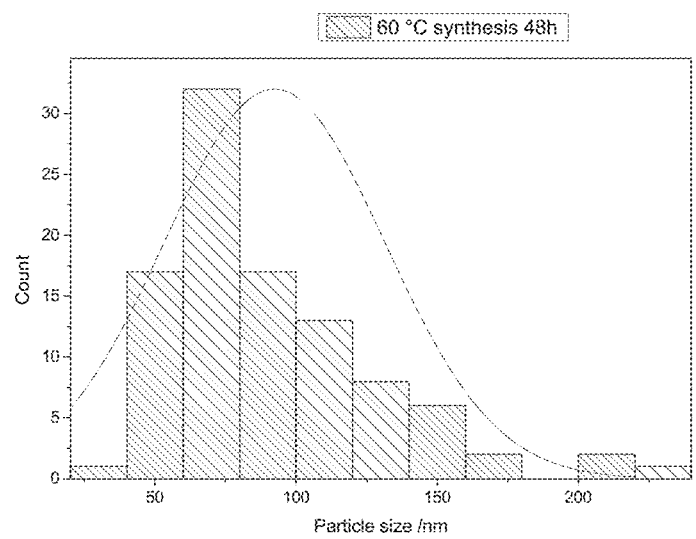
FIG. 9 shows a histogram representing the particle distribution of MIL-100(Fe) nanoparticles obtained in Example 2, using Image J software. The average particle size is 92 nm±39.
Figure 10:
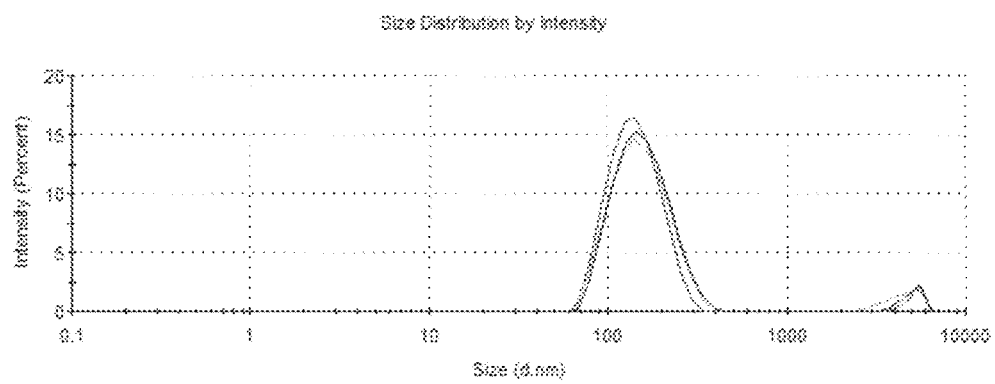
FIG. 10 shows three DLS measurements conducted on MIL-100(Fe) nanoparticles obtained in Example 2, with an average hydrodynamic diameter of the principal peaks of 162 nm±57 and a polydispersibility index of 0.269.
Figure 11:
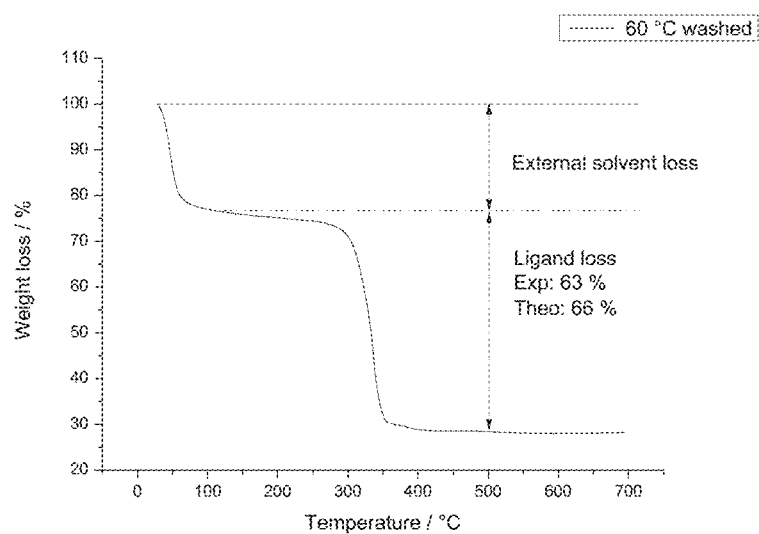
FIG. 11 shows a thermal gravimetric analysis plot of MIL-100(Fe) nanoparticles obtained in Example 2, conducted under oxygen atmosphere (heating rate of 5° C. per minute).
Figure 12:
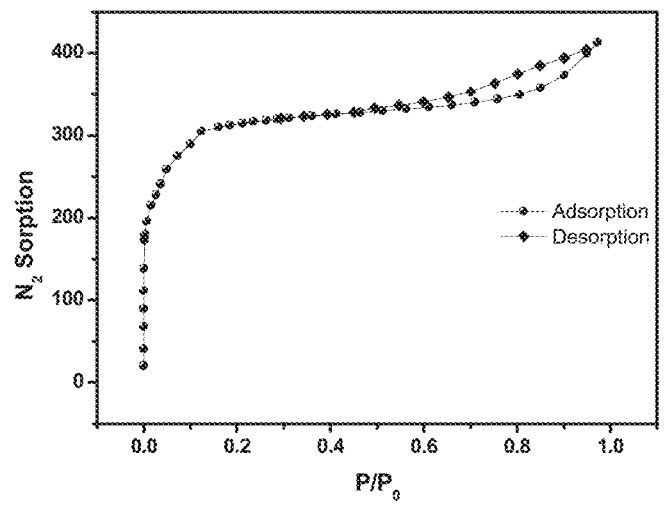
FIG. 12 shows $N_2$ adsorption (dots) and desorption (diamonds) isotherms obtained from MIL-100(Fe) nanoparticles obtained in Example 2 (Evacuated under primary vacuum at 150° C. for 15 h). The Surface area obtained is 1220 $m^2g^{-1}$ (evaluated using the BET model).
Figure 13:
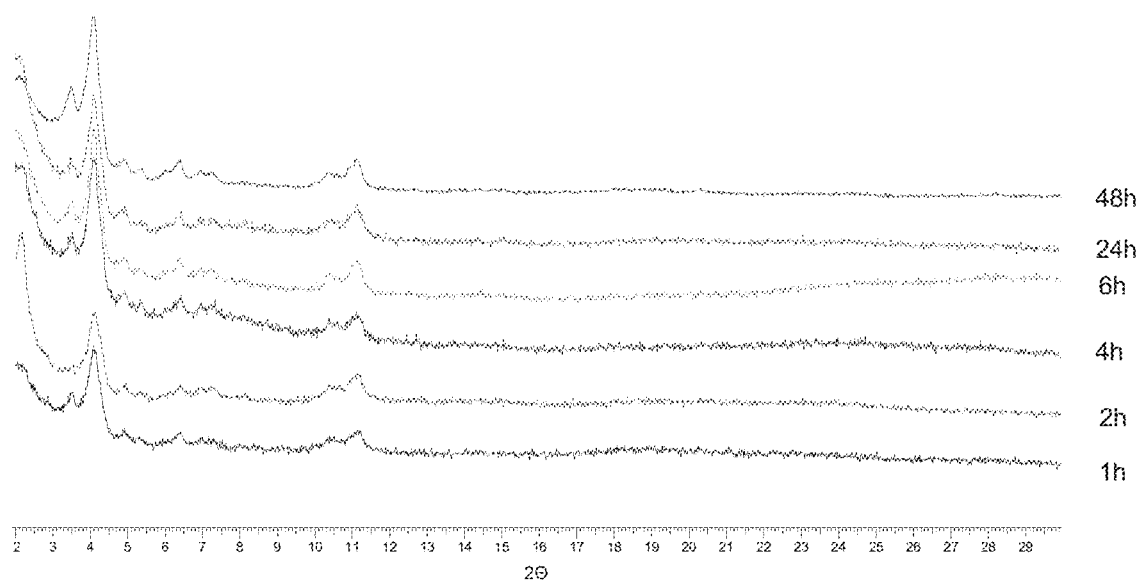
FIG. 13 shows powder X-ray diffraction (PXRD) patterns of samples of MIL-100(Fe) nanoparticles obtained in comparative Example 3, taken from the reaction mixture after various reaction times (1 h, 2 h, 4 h, 6 h, 24 h and 48 h).
Figure 14:
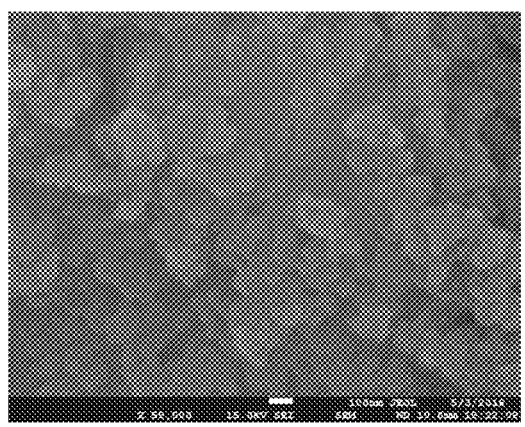
FIG. 14 shows a scanning electron microscopy (SEM) image of MIL-100(Fe) nanoparticles obtained in comparative Example 3.
Figure 15:
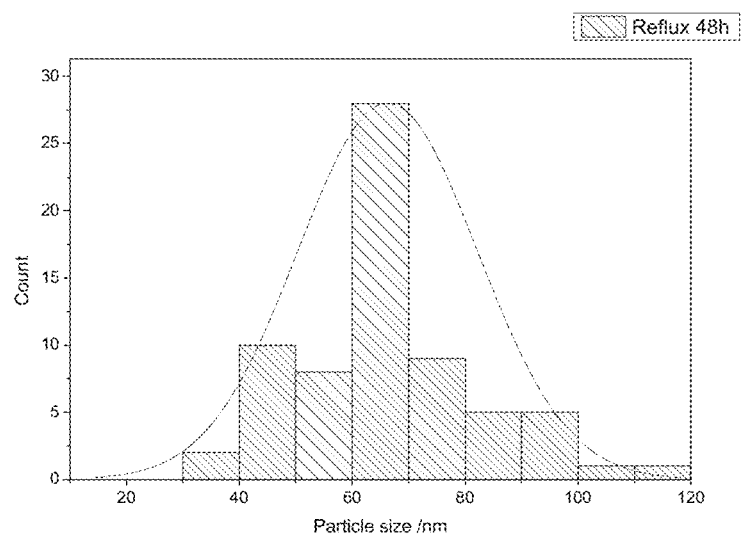
FIG. 15 shows a histogram representing the particle distribution of MIL-100(Fe) nanoparticles obtained in comparative Example 3, using Image J software. The average particle size is 66 nm±16.
Figure 16:
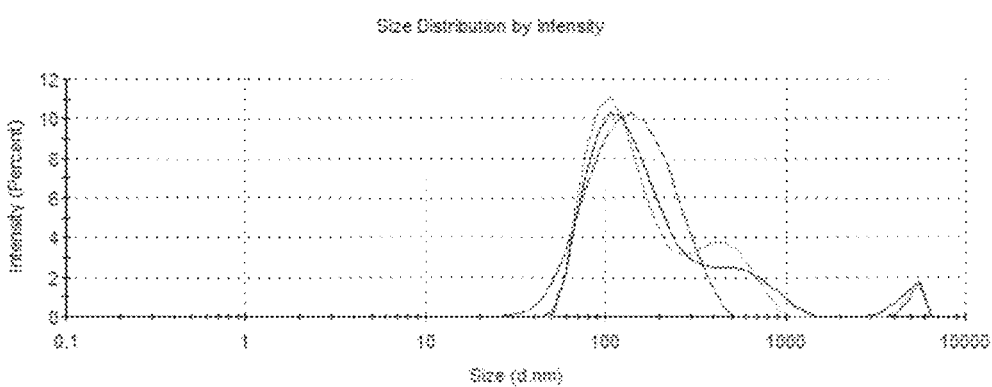
FIG. 16 shows three DLS measurements conducted on MIL-100(Fe) nanoparticles obtained in comparative Example 3, with an average hydrodynamic diameter of the principal peaks of 155 nm±80 (DLS results show the presence of two populations, hence hydrodynamic diameter provided is the average) and a polydispersibility index of 0.346.
Figure 17:
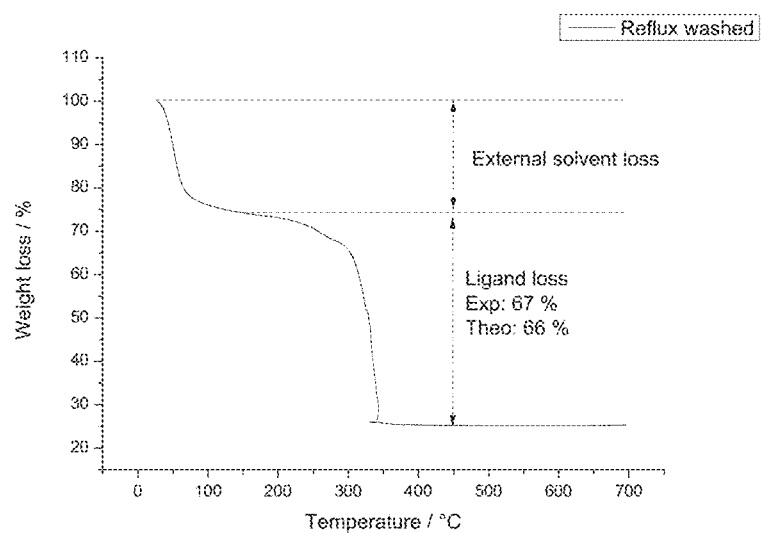
FIG. 17 shows a thermal gravimetric analysis plot of MIL-100(Fe) nanoparticles obtained in comparative Example 3, conducted under oxygen atmosphere (heating rate of 5° C. per minute).
Figure 18:
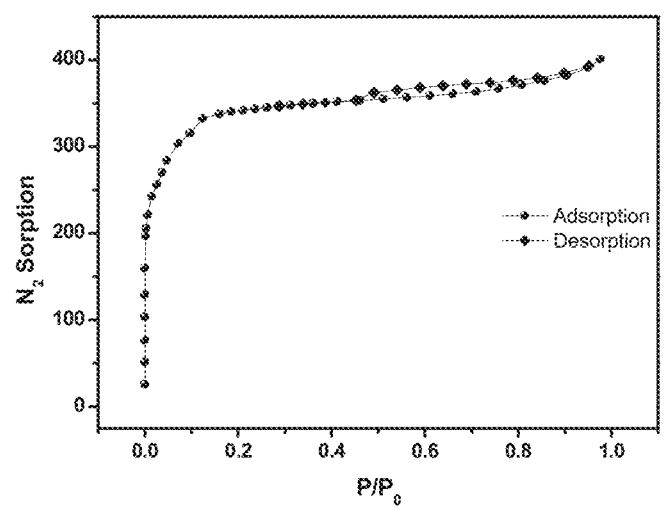
FIG. 18 shows $N_2$ adsorption (dots) and desorption (diamonds) isotherms obtained from MIL-100(Fe) nanoparticles obtained in comparative Example 3 (Evacuated under primary vacuum at 150° C. for 15 h). The Surface area obtained is 1314 $m^2g^{-1}$ (evaluated using the BET model).

synthesis depicting the impact of the synthesis temperature and conditions on the size of the crystals obtained.

DEFINITIONS

To facilitate an understanding of the present invention, a number of terms and phrases are defined below:

As used herein other than the claims, the terms "a," "an," "the," and/or "said" means one or more. As used herein in the claim(s), when used in conjunction with the words "comprise," "comprises" and/or "comprising," the words "a," "an," "the," and/or "said" may mean one or more than one. As used herein and in the claims, the terms "having," "has," "is," "have," "including," "includes," and/or "include" has the same meaning as "comprising," "comprises," and "comprise." As used herein and in the claims "another" may mean at least a second or more. As used herein and in the claims, "about" refers to any inherent measurement error or a rounding of digits for a value (e.g., a measured value, calculated value such as a ratio), and thus the term "about" may be used with any value and/or range.

The phrase "a combination thereof" "a mixture thereof" and such like following a listing, the use of "and/or" as part of a listing, a listing in a table, the use of "etc" as part of a listing, the phrase "such as," and/or a listing within brackets with "e.g.," or i.e., refers to any combination (e.g., any sub-set) of a set of listed components, and combinations and/or mixtures of related species and/or embodiments described herein though not directly placed in such a listing are also contemplated. Such related and/or like genera(s), sub-genera(s), specie(s), and/or embodiment(s) described herein are contemplated both in the form of an individual component that may be claimed, as well as a mixture and/or a combination that may be described in the claims as "at least one selected from," "a mixture thereof" and/or "a combination thereof."

In general, the term "substituted" whether preceded by the term "optionally" or not, and substituents contained in formulae of this invention, refer to the replacement of hydrogen radicals in a given structure with the radical of a specified substituent.

When more than one position in any given structure may be substituted with more than one substituent selected from a specified group, the substituent may be either the same or different at every position. As used herein, the term "substituted" is contemplated to include all permissible substituents of organic compounds.

As used herein, the term "alkyl", refers to straight and branched alkyl groups. In certain embodiments, as used herein, "lower alkyl" is used to indicate those alkyl groups (substituted, unsubstituted, branched or unbranched) having about 1-6 carbon atoms. Illustrative alkyl groups include, but are not limited to, for example, methyl, ethyl, n-propyl, isopropyl, allyl, n-butyl, sec-butyl, isobutyl, tert-butyl, n-pentyl, sec-pentyl, isopentyl, tert-pentyl, n-hexyl, sec-hexyl, moieties and the like, which again, may bear one or more substituents.

An analogous convention is used for unsaturated counterparts to alkyl groups. Namely, a $C_{2-12}$alkenyl group as used herein refers to a hydrocarbon group formed by placing at least one carbon double bond in the middle or at the terminal of the $C_{2-12}$alkyl group. Examples thereof are an ethenyl group, a propenyl group, or a butenyl group. A $C_{2-12}$alkynyl group as used herein refers to a hydrocarbon group formed by placing at least one carbon triple bond in the middle or at the terminal of the $C_{2-12}$alkyl group. Examples thereof are an ethynyl group, a propynyl group, or a butynyl group.

As used herein, the term "aryl" refers to an aromatic system comprising at least one ring that satisfies Hückel's aromaticity rule. Said aryl is optionally substituted and may comprise from 6 to 50 carbon atoms, for example 6 to 20 carbon atoms, for example 6 to 10 carbon atoms. Examples of aryl groups include, but are not limited to, phenyl, indanyl, indenyl, naphthyl, phenanthryl and anthracyl.

In general, the term "heteroaryl moiety", as used herein, refers a cyclic unsaturated radical having from about five to about ten ring atoms of which one ring atom is selected from S, O and N; zero, one or two ring atoms are additional heteroatoms independently selected from S, O and N; and the remaining ring atoms are carbon, the radical being joined to the rest of the molecule via any of the ring atoms, such as, for example, pyridyl, pyrazinyl, pyrimidinyl, pyrrolyl, pyrazolyl, imidazolyl, thiazolyl, triazolyl, oxazolyl, isooxazolyl, thiadiazolyl, oxadiazolyl, thiophenyl, furanyl, quinolinyl, isoquinolinyl, and the like.

The term "heteroalkyl", as used herein, refers to alkyl moieties in which one or more carbon atoms in the main chain have been substituted with a heteroatom. Thus, a heteroalkyl group refers to an alkyl chain which contains one or more oxygen, sulfur, nitrogen, phosphorus or silicon atoms, i.e., in place of carbon atoms, for example, at least one heteroatom to 20 heteroatoms, such as one to 15 heteroatoms, or one to 5 heteroatoms, or one, two, three or four heteroatoms. Heteroalkyl moieties may be branched or linear unbranched.

The term "Alkoxy", as used herein, refers to a moiety —O-alkyl, with exemplary embodiments including, but not limited to, methoxy, ethoxy, n-propoxy, isopropoxy, n-butoxy, t-butoxy, sec-butoxy, n-pentoxy, n-hexoxy.

The terms "halo" and "halogen" as used herein refer to an atom selected from fluorine, chlorine, bromine and iodine.

The abbreviation "acac", as used herein, refers to an acetylacetone ligand.

As used herein, the term "independently" refers to the fact that the substituents, atoms or moieties to which these terms refer, are selected from the list of variables independently from each other (i.e., they may be identical or the same).

As used herein, the term "about" can refer to a variation of ±5%, 10%, 20%, or +25%, of the value specified. For example, "about 50" percent can in some embodiments carry a variation from 45 to 55 percent. For integer ranges, the term "about" can include one or two integers greater than and/or less than a recited integer. Unless indicated otherwise herein, the term "about" is intended to include values, e.g., concentration values, proximate to the recited range that are equivalent in terms of the functionality of the individual ingredient, the composition, or the embodiment.

As used herein, the term "and/or" means any one of the items, any combination of the items, or all of the items with which this term is associated.

As will be understood by the skilled artisan, all numbers, including those expressing quantities of ingredients, properties such as cavity/pore size and BET specific surface area, reaction conditions, and so forth, are approximations and are understood as being optionally modified in all instances by the term "about." These values can vary depending upon the desired properties sought to be obtained by those skilled in the art utilizing the teachings of the descriptions herein. It is also understood that such values inherently contain variability necessarily resulting from the standard deviations found in their respective testing measurements.

As will be understood by one skilled in the art, for any and all purposes, particularly in terms of providing a written description, all ranges recited herein also encompass any and all possible subranges and combinations of subranges thereof, as well as the individual values making up the range, particularly integer values. A recited range includes each specific value, integer, decimal, or identity within the range. Any listed range can be easily recognized as sufficiently describing and enabling the same range being broken down into at least equal halves, thirds, quarters, fifths, or tenths. As a non-limiting example, each range discussed herein can be readily broken down into a lower third, middle third and upper third, etc.

One skilled in the art will also readily recognize that where members are grouped together in a common manner, such as in a Markush group, the invention encompasses not only the entire group listed as a whole, but each member of the group individually and all possible subgroups of the main group. Additionally, for all purposes, the invention encompasses not only the main group, but also the main group absent one or more of the group members. The invention therefore envisages the explicit exclusion of any one or more of members of a recited group.

Accordingly, provisos may apply to any of the disclosed categories or embodiments whereby any one or more of the recited elements, species, or embodiments, may be excluded from such categories or embodiments, for example, as used in an explicit negative limitation.

As used herein, the expression "three-dimensional structure" is understood to mean a three-dimensional sequence or repetition of units, as is conventionally understood in the field of MOF materials, that are also characterized as "organometallic polymers".

As used herein, the term "solid" refers to any type of crystalline material. Said solid may be, for example, in the form of crystals, powder or particles of varied forms, for example of spherical, lamellar, etc. form. The particles may be in the form of nanoparticles.

As used herein, the term "nanoparticle" refers to a particle smaller than 1 m in size. In particular, the solid Fe-, Al- or Ti-based MOF nanoparticles according to the invention may have a diameter of less than 1000 nanometers, preferably less than 500 nm, more preferably less than 250 nm, more preferably less than 100 nm, and most particularly less than 90 nm.

As used herein, the term "ligand" refers to a ligand (including, for example, neutral species and ions) coordinated to at least two Fe, Al or Ti metal centers (or two metal centers of different nature in the case of doped Fe, Al or Ti-based materials according to a variant of the invention, for example Ru-doped MOF materials), which participates in providing distance between these metals and in forming empty spaces or pores.

DETAILED DESCRIPTION OF EXEMPLARY EMBODIMENTS

In one aspect, the present invention provides a microwave-free process for preparing nanoparticles of porous crystalline Fe-, Al- or Ti-based MOF carboxylate material with low polydispersity index, comprising steps of:
A) mixing in an aqueous solvent system:
(i) at least a first inorganic metallic precursor in the form of a metal M, a salt of a metal M or a coordination complex comprising the metal ion $M^{2+}$ selected from $Fe^{2+}$, $Fe^{3+}$, $Ti^{3+}$, $Ti^{4+}$ or $Al^{3+}$;

(ii) at least one precursor ligand L' having the structure $R_1—(C(=O)—R_3)_q$ wherein:
q represents an integer from 2 to 6; preferably q represents 2, 3 or 4;
each occurrence of $R_3$ is independently selected from a halogen atom, —OH, —OY wherein Y represents an alkali metal cation, —$OR_4$, —O—C(=O)$R_{3A}$ or —$NR_{3A}R_{3B}$, wherein $R_{3A}$ and $R_{3B}$, identical or different, represent $C_{1-12}$ alkyl radicals;
$R_1$ independently represents:
(a) a $C_{1-12}$alkyl, $C_{2-12}$alkenyl or $C_{2-12}$alkynyl radical;
(b) a fused or non-fused monocyclic or polycyclic aryl radical, comprising 6 to 50 carbon atoms;
(c) a fused or non-fused monocyclic or polycyclic heteroaryl, comprising 4 to 50 carbon atoms;
$R_1$ optionally bearing one or more substituents independently selected from a halogen atom, —OH, —$NH_2$, —$NO_2$ or $C_{1-6}$alkyl; and B) allowing the mixture obtained in step A) to react at a temperature below the boiling point temperature of the aqueous solvent system; so as to obtain the said nanoparticles;

wherein the process is carried out in the absence of additives aimed at solubilizing the ligand precursor L' in the solvent system, such as base additives, or additives that may have an effect on the MOF crystallization process, such as acid additives.

Advantageously, in step B), the reaction temperature may be preferably at least 10° C. below the boiling point temperature of the aqueous solvent system.

Advantageously, the process is not carried out under reflux conditions.

Advantageously, the process may be carried out in the absence of acid or base additives. In fact, one stark advantage of the process of the invention is that it avoids the use of any additives typically used in conventional MOF syntheses, notably for solubilizing ligand precursors in the reaction mixture (such as NaOH, KOH, LiOH, amines, etc.) and/or to modulate the crystallization process (such as HF, $HNO_3$, etc.).

As such, step A) of the process of the invention may consist in mixing in an aqueous solvent system at least one inorganic metallic precursor as defined above and in any variants herein (optionally with a second, third or more inorganic metallic precursor if mixed-metal MOFs are desired), at least one precursor ligand L' as defined above and in any variants herein, and optionally particles, preferably nanoparticles, of a material different from a MOF such as iron oxide nanoparticles (if core-shell particles where the core is made of the material different from a MOF, encapsulated within a shell made of MOF, are desired). Preferably, the at least one precursor ligand L' is not a carboxylate salt.

Thus, the present invention advantageously provides a microwave-free process for preparing nanoparticles of porous crystalline Fe-, Al- or Ti-based MOF carboxylate material with low polydispersity index, comprising a step of reacting a mixture consisting of:
A. an aqueous solvent system;
B. at least a first inorganic metallic precursor in the form of a metal M, a salt of a metal M or a coordination complex comprising the metal ion $M^{2+}$ selected from $Fe^{2+}$, $Fe^{3+}$, $Ti^{3+}$, $Ti^{4+}$ or $Al^{3+}$; and
C. at least one precursor ligand L' having the structure $R_1—(C(=O)—R_3)_q$ wherein:
q represents an integer from 2 to 6; preferably q represents 2, 3 or 4;

each occurrence of $R_3$ is independently selected from a halogen atom, —OH, —$OR_4$, —O—C(=O)$R_{3A}$ or —$NR_{3A}R_{3B}$, wherein $R_{3A}$ and $R_{3B}$, identical or different, represent $C_{1-12}$ alkyl radicals;

$R_1$ independently represents:
  (a) a $C_{1-12}$alkyl, $C_{2-12}$alkenyl or $C_{2-12}$alkynyl radical;
  (b) a fused or non-fused monocyclic or polycyclic aryl radical, comprising 6 to 50 carbon atoms;
  (c) a fused or non-fused monocyclic or polycyclic heteroaryl, comprising 4 to 50 carbon atoms;
  $R_1$ optionally bearing one or more substituents independently selected from a halogen atom, —OH, —$NH_2$, —$NO_2$ or $C_{1-6}$alkyl; and D. optionally particles, preferably nanoparticles, of a material different from a MOF, preferably nanoparticles of a metal oxide;

at a temperature below the boiling point temperature of the aqueous solvent system, preferably at least 10° C. below the boiling point temperature of the aqueous solvent system; so as to obtain the said nanoparticles.

In particular, the process is advantageously carried out in the absence of additives aimed at solubilizing the at least one ligand precursor L' in the solvent system, such as base additives, or additives that may affect the MOF crystallization process, such as acid additives.

Advantageously, the ligand precursor L' may have the structure $R_1$—(C(=O)—$R_3$)$_q$ wherein q and $R_1$ are as defined above, and each occurrence of $R_3$ may be independently selected from a halogen atom, —OH, —$OR_4$, —O—C(=O)$R_{3A}$ or —$NR_{3A}R_{3B}$, wherein $R_{3A}$ and $R_{3B}$, identical or different, represent $C_{1-12}$ alkyl radicals.

Advantageously, the process is carried out in the absence of additives (e.g., a base) which leads to hydrolysis of the ligand precursor L' into the corresponding carboxylic salt.

Advantageously, the ligand precursor L' may have the structure $R_1$—(C(=O)OH)$_q$ wherein q and $R_1$ are as defined above. Still more advantageously, the process may be carried out in the absence of additives (e.g., a base such as NaOH, KOH, LiOH) which leads to hydrolysis of the ligand precursor L' into the corresponding carboxylic salt $R_1$—(C(=O)OY)$_q$ wherein Y represents an alkali metal cation such as Li, K, Na.

Advantageously, the ligand precursor L' may be a di-, tri-, tetra- or hexadentate precursor ligand selected from:

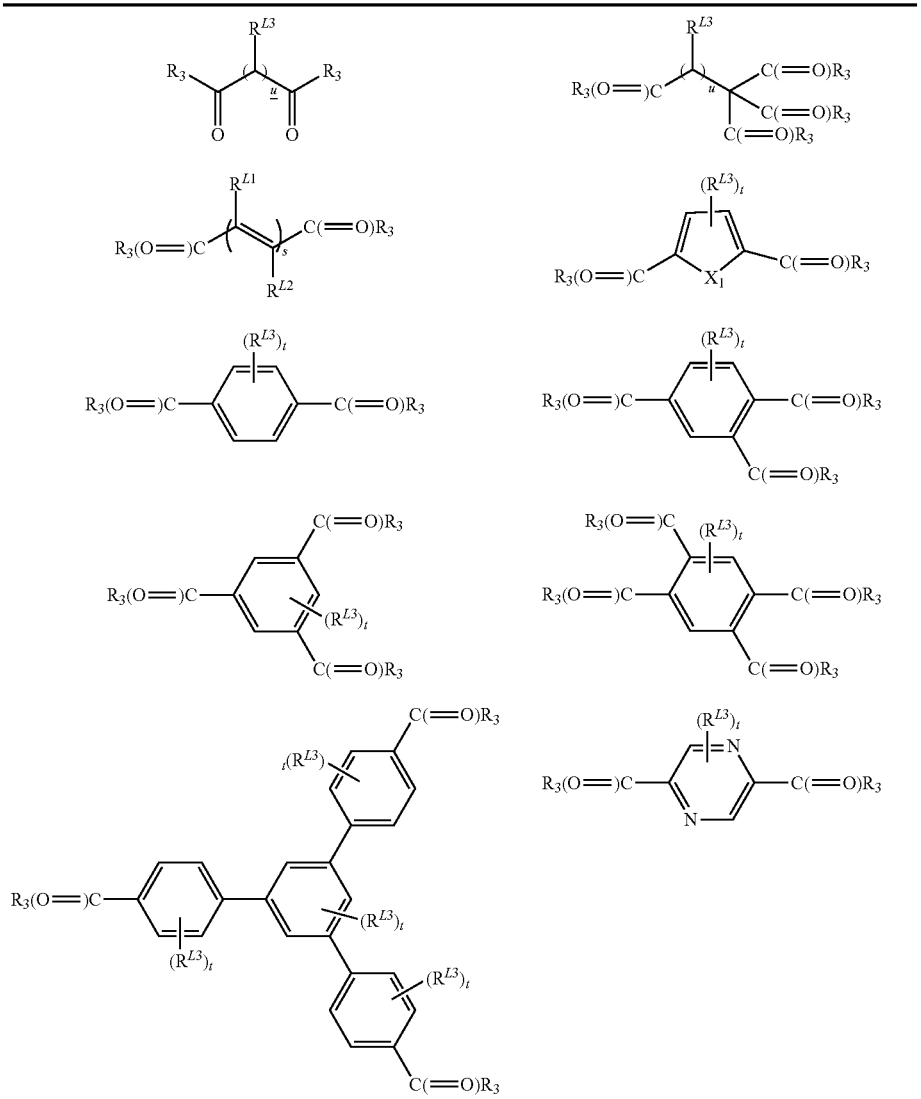

-continued
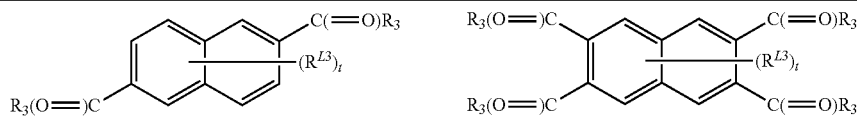
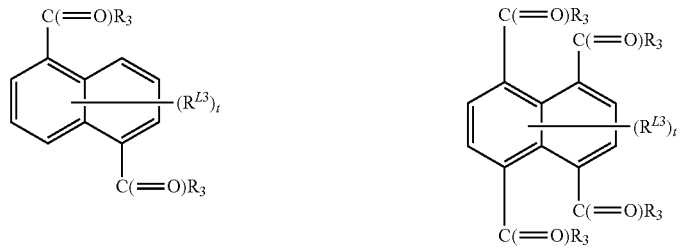
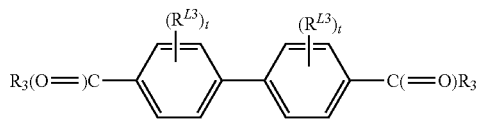
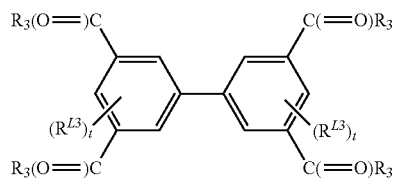
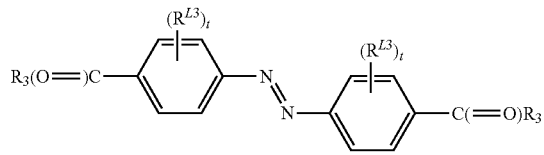
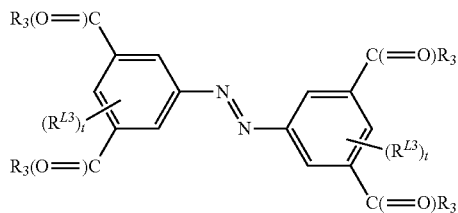
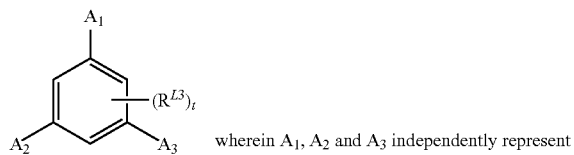
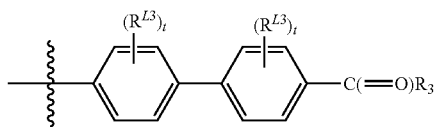 wherein $A_1$, $A_2$ and $A_3$ independently represent
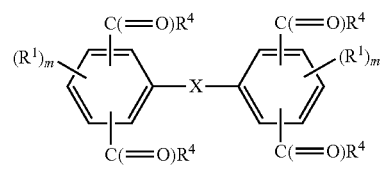
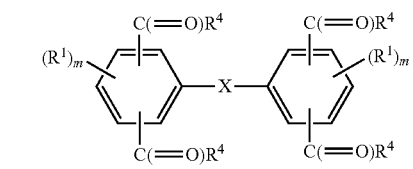 (II)

wherein $R_3$ is as defined above,
s represents an integer from 1 to 4,
each occurrence of t independently represents an integer from 1 to 4,
u represents an integer from 1 to 7,
each occurrence of $R^{L1}$ and $R^{L2}$ independently represent H, a halogen or a $C_1$ to $C_6$ alkyl, and
each occurrence of $R^{L3}$ independently represents H, a halogen atom, —OH, —$NH_2$, —$NO_2$ or $C_{1-6}$alkyl;
X represents a covalent bond, C=O, $CH_2$, N=N, NH, O, S, $SO_2$, C=C, —O—$(CH_2)_p$—O—, —NH—$(CH_2)_p$—NH— or —S—$(CH_2)_p$—S— where p represents an integer ranging from 1 to 4; preferably C=O, $CH_2$, N=N, NH, O, S, $SO_2$, —O—$(CH_2)_p$—O—, —NH—$(CH_2)_p$—NH— or —S—$(CH_2)_p$—S—; most preferably C=O, $CH_2$, or N=N;
each occurrence of m independently represents an integer from 1 to 3;
and each occurrence of $R^1$ independently represents H, a halogen atom, OH, $NH_2$, $NO_2$ or a $C_{1-6}$alkyl, preferably each occurrence of $R^1$ represents H; and
each occurrence of $R^4$ independently represents —OH, —$OM^i$ where $M^i$ represents an alkali metal cation, a halogen atom, or a —$OR^5$, —O—C(=O)$R^5$ or —$NR^5R^{5'}$ moiety, wherein $R^5$ and $R^{5'}$ independently represent $C_{1-12}$alkyl; preferably each occurrence of $R^1$ represents H and each occurrence of $R^4$ represents OH; most preferably X represents $CH_2$ and each occurrence of $R^1$ represents H and each occurrence of $R^4$ represents OH.

Advantageously, in the di-, tri-, tetra- or hexadentate precursor ligands described above, $R_3$ may preferably be different from —OY wherein Y represents an alkali metal cation; and $R_4$ may preferably be different from —$OM^i$ where $M^i$ represents an alkali metal cation.

Advantageously, in the di-, tri-, tetra- or hexadentate precursor ligands described above, each occurrence of $R_3$ may be independently selected from a halogen atom, —OH, —$OR_{3A}$, —O—C(=O)$R_{3A}$ or —$NR_{3A}R_{3B}$, wherein $R_{3A}$ and $R_{3B}$, identical or different, represent $C_{1-12}$ alkyl radicals. Likewise, advantageously, each occurrence of $R^4$ may independently represent —OH, a halogen atom, or a —$OR^5$, —O—C(=O)$R^5$ or —$NR^5R^{5'}$ moiety, wherein $R^5$ and $R^{5'}$ independently represent $C_{1-12}$alkyl; preferably each occurrence of $R^1$ represents H and each occurrence of $R^4$ represents OH; most preferably X represents $CH_2$ and each occurrence of $R^1$ represents H and each occurrence of $R^4$ represents OH.

Among the bis-$C_6$aryl-containing tetradentate ligand precursors having the structure (II), mention may be made of ligand precursors of formulae ($II^4_1$) through ($II^4_3$):

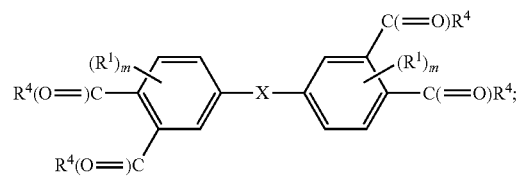

preferably formula ($II^4_1$) wherein m, $R_1$, $R_4$ and X are as defined generally and in any variants above.

Advantageously, in formulae ($II^4_1$) through ($II^4_3$) above, each occurrence of $R^4$ may independently represent —OH, a halogen atom, or a —$OR^5$, —O—C(=O)$R^5$ or —$NR^5R^{5'}$ moiety, wherein $R^5$ and $R^{5'}$ independently represent $C_{1-12}$alkyl; preferably each occurrence of $R^4$ represents OH.

Among the bis-$C_6$aryl-containing tetradentate ligand precursors having the structure ($II^4$), mention may be made of precursors of formula (II), ($II^4_1$), ($II^4_2$) or ($II^4_3$) wherein X represents a covalent bond, C=O, $CH_2$ or N=N; preferably precursors of formula (II) or ($II^4_1$) wherein X represents $CH_2$.

Advantageously, the bis-$C_6$aryl-containing tetradentate ligand precursor may have one of the following structures:

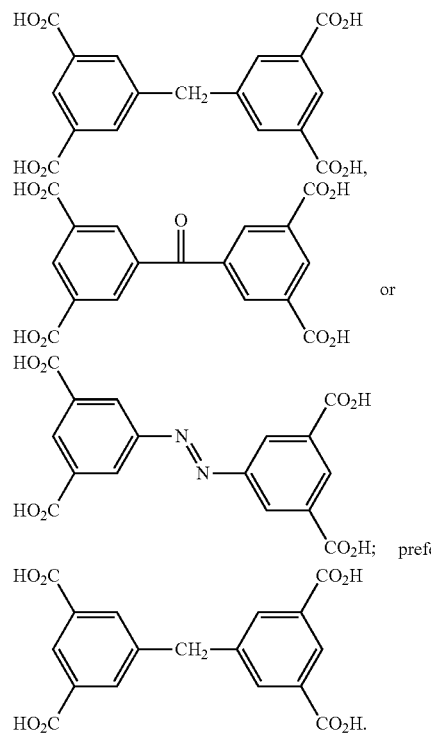

The reader may find further guidance on the preparation of MOF materials from bis-$C_6$aryl-containing tetradentate ligand precursors of formula (II), notably for the preparation of Ti-based MOF materials with high condensation degree, in European Patent Application No 16305692.2 filed on 10 Jun. 2016, the entire contents of which are hereby incorporated by reference. In particular, the teachings of EP16305692.2 may be adapted by changing the temperature conditions and solvent system to match those of the present invention; i.e., solvent system as described herein, and

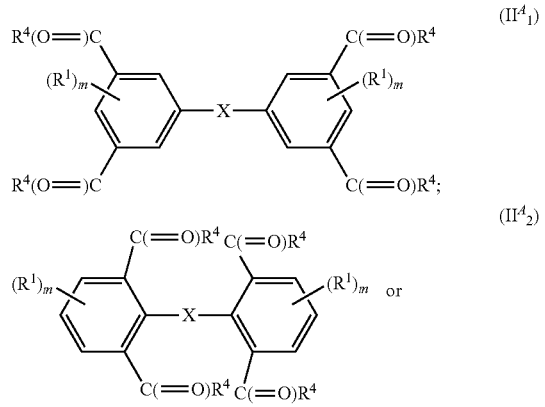

temperature below the boiling point temperature of the solvent system, preferably at least 10° C. below the boiling point temperature of the aqueous solvent system.

Advantageously, the precursor ligand L' may be a di-, tri- or tetracarboxylic acid selected from: $C_2H_2(CO_2H)_2$ (fumaric acid), $C_2H_4(CO_2H)_2$ (succinic acid), $C_3H_6(CO_2H)_2$ (glutaric acid), $C_4H_4(CO_2H)_2$ (muconic acid), $C_4H_3(CO_2H)_2$ (adipic acid), $C_7H_{14}(CO_2H)_2$ (azelaic acid), $C_5H_3S(CO_2H)_2$ (2,5-thiophenedicarboxylic acid), $C_6H_4(CO_2H)_2$ (terephthalic acid), $C_6H_2N_2(CO_2H)_2$ (2,5-pyrazine dicarboxylic acid), $C_{10}H_6(CO_2H)_2$ (naphthalene-2,6-dicarboxylic acid), $C_{12}H_3(CO_2H)_2$ (biphenyl-4,4'-dicarboxylic acid), $C_{12}H_3N_2(CO_2H)_2$ (azobenzenedicarboxylic acid), $C_6H_3(CO_2H)_3$ (benzene-1,2,4-tricarboxylic acid), $C_6H_3(CO_2H)_3$ (benzene-1,3,5-tricarboxylic acid), $C_{24}H_{15}(CO_2H)_3$ (benzene-1,3,5-tribenzoic acid), $C_6H_2(CO_2H)_4$ (benzene-1,2,4,5-tetracarboxylic acid, $C_{10}H_4(CO_2H)_4$ (naphthalene-2,3,6,7-tetracarboxylic acid), $C_{10}H_4(CO_2H)_4$ (naphthalene-1,4,5,8-tetracarboxylic acid), $C_{12}H_6(CO_2H)_4$ (biphenyl-3,5,3',5'-tetracarboxylic acid); modified analogs selected from 2-aminoterephthalic acid, 2-nitroterephthalic acid, 2-methylterephthalic acid, 2-chloroterephthalic acid, 2-bromoterephthalic acid, 2,5-dihydroxoterephthalic acid, tetrafluoroterephthalic acid, tetramethylterephthalic acid, dimethyl-4,4'-biphenydicarboxylic acid, tetramethyl-4,4'-biphenydicarboxylic acid, dicarboxy-4,4'-biphenydicarboxylic acid, or 2,5-pyrazyne dicarboxylic acid; or ligand derivatives selected from 2,5-diperfluoroterephthalic acid, azobenzene-4,4'-dicarboxylic acid, 3,3'-dichloro-azobenzene-4,4'-dicarboxylic acid, 3,3'-dihydroxoazobenzene-4,4'-dicarboxylic acid, 3,3'-diperfluoroazobenzene-4,4'-dicarboxylic acid, 3,5,3',5'-azobenzene tetracarboxylic acid, 2,5-dimethylterephthalic acid, or perfluoroglutaric acid. For example, the precursor ligand L' may be benzene-1,3,5-tricarboxylic acid (trimesic acid), benzene-1,2,4-tricarboxylic acid or benzene-1,2,4,5-tetracarboxylic acid.

The inorganic metallic precursor may be any precursor suitable for the preparation of Fe-, Al- or Ti-based MOF carboxylate material. The reader can draw from extensive MOF literature available to date to select suitable inorganic metallic precursors. For example, the suitable inorganic metallic precursor may be in the form of a metal (Fe, Al or Ti), a Fe-, Al- or Ti-based metallic salt or a coordination complex comprising the metal ion $M^{z+}$ selected from $Fe^{2+}$, $Fe^{3+}$, $Ti^{3+}$, $Ti^{4+}$ or $Al^{3+}$. For example, the inorganic metallic precursor may be a $Fe^{2+}$ salt such as $FeCl_2$ or $Fe(CO_2CH_3)_2$ (iron acetate).

For example, the inorganic metallic precursor may be a $Fe^{3+}$ salt such as $FeCl_3$, $Fe(NO_3)_3$, $Fe(ClO_4)_3$ iron perchlorate or $Fe_2(SO_4)_3$ iron sulfate.

For example, the inorganic metallic precursor may be a $Al^{3+}$ salt such as $AlCl_3$, $Al(OH)_3$ Aluminum hydroxide, $Al(NO_3)_3$ Aluminum nitrate, $Al_2(SO_4)_3$ Aluminum sulfate, $Al(ClO_4)_3$ Aluminum perchlorate or $Al(CO_2CH_3)_3$ Aluminum acetate.

For example, the inorganic metallic precursor may be a $Ti^{3+}$ salt such as $TiCl_3$.

For example, the inorganic metallic precursor may be a $Ti^{4+}$ salt such as $TiCl_4$, $TiO(acac)_2$, $TiOSO_4$ (titanyl sulfate), $Ti(SO_4)_2$ or titanium alkoxides of formula (III):

$$Ti(OR^3)_4 \quad (III)$$

wherein each occurrence of $R^3$ independently represents a linear or branched $C_{1-6}$ alkyl moiety.

In an exemplary variant, the inorganic metallic precursor may be a $Fe^{3+}$ salt such as $FeCl_3$, and the precursor ligand L' may be benzene-1,3,5-tricarboxylic acid or benzene-1,2,4-tricarboxylic acid.

In another exemplary variant, the inorganic metallic precursor may be $Fe^{3+}$ salt such as $FeCl_3$, and the precursor ligand L' may be benzene-1,2,4,5-tetracarboxylic acid (BTeC).

The process according to the invention may be carried out in any suitable solvent system. Preferably, the solvent system may be a polar solvent system, which may be composed of a single solvent or a mixture of two or more polar solvents. Advantageously, the solvent system may be an aqueous solvent system. The solvents that may be used may especially be chosen from $H_2O$, ethanol, isopropanol, dimethyl carbonate, ethylene glycol, ethyl lactate, ethyl acetate, sulfolane, benzyl alcohol or a mixture of two or more thereof. Preferably, the solvent system is aqueous, and thus contains at least $H_2O$, and optionally any one or more of the aforementioned solvents. Preferably, the solvent system is $H_2O$, ethanol, or a mixture thereof; most preferably $H_2O$. The above-mentioned solvents are all environmentally friendly solvents. However other non environmentally friendly solvents could be used, such as dimethylformamide-based solvent systems.

The process according to the invention is advantageously carried out at a temperature below the boiling point of the solvent system used to carry out the reaction, preferably at least 10° C. below the boiling point temperature of the aqueous solvent system. This is particularly advantageous compared to existing methods for preparing MOF materials, notably in the form of nanoparticles, which involve either high temperatures (reflux, or solvothermal methodology) or microwave.

Advantageously, the process may be carried out in $H_2O$ as sole solvent system. As such, the process may be carried out at a temperature <100° C., preferably <95° C., preferably ≤90° C., preferably ≤85° C., preferably ≤80° C., more preferably ≤75° C., yet more preferably ≤70° C., still preferably ≤65° C., most preferably ≤60° C. For example, the process may be carried out in $H_2O$ as sole solvent system at room temperature (20° C.±5° C.). In another example, the process may be carried out in $H_2O$ as sole solvent system at 60° C.±5° C. As will be readily apparent, a great advantage of the process of the invention is that is involves low temperatures, and thus is environmentally friendly and less costly than conventional methods (reflux, solvothermal, microwave methodologies). In addition, it allows the preparation of MOF-based composites in the presence of fragile species such as contrast agents (e.g., iron oxides), and/or allows the introduction of reactive species within the MOF framework (e.g., Ru sites) which prove very useful for applications in heterogenous catalysis. Additionally, the process of the invention allows access to brand new MOF phases that cannot be prepared by the conventional higher energy methods (reflux, solvothermal, microwave methodologies). Cf. Example 6 which describes the preparation of a new MOF(Fe) carboxylate phase, which has never been reported thus far.

As such, the present invention also relates to a new MOF carboxylate material obtainable as nanoparticles by the process of the invention, which MOF with formula $Fe_3O(H_2O)_2(OH)_4(H_2—BTeC)_{1.5}$ is composed of a three-dimensional succession of building units connected through BTeC linkers. Without wishing to be bound by any particular theory, it is believed that this new MOF phase is composed of μ3-oxo trimers. As exemplified in Example 6, this new MOF material (also referred to as "Fe/BTeC") may be prepared from $FeCl_3$ as metallic precursor and 1,2,4,5-benzene tetracarboxilic acid as organic ligand precursor L'.

Advantageously, the process according to the invention may be carried out under $1.10^5$ Pa (ambient pressure conditions). All temperatures mentioned in the present document, when referring to reaction conditions of the process of the invention, refer to temperatures under atmospheric pressure (ambient pressure conditions).

Advantageously, the process may be carried out under dilute conditions. In other words, the process of the invention may involve inorganic metallic precursor concentrations of less than 50 mM, preferably ≤40 mM, preferably ≤30 mM, most preferably ≤25 mM. For example, the inorganic metallic precursor concentration in the solvent system may be about 20 mM. The dilution level to be adopted will largely depend on the temperature used for the reaction. The lower the temperature (e.g., room temperature), the higher the dilution level will be. The dilute conditions are particularly advantageous as they allow to better control the nanoparticle size: smaller average particle size can be accessed, and with a lower polydispersity index (narrower distribution of particle size).

Under dilute conditions, the reacting species still are somewhat dissolved in the solvent system, even when water is used as sole solvent system. As the reaction progresses (as the MOF nanoparticles are formed and precipitate out of the solvent system), dissolved reactants are consumed thereby slowly driving the equilibrium towards the dissolution of reactants into the solvent system. The dilute conditions also implies that the formation of nanoparticles is particularly slow and controlled. This in turn results in the formation of MOF nanoparticles of much better quality than what other conventional processes can yield, notably in terms of average particle size and monodispersity: the process according to the invention, when conducted under dilute conditions as described above allows the preparation of MOF nanoparticles of smaller average particle with a lower polydispersity index, which is a great advantage over other known processes.

Accordingly, advantageously the process according to the invention allows the preparation of nanoparticles, the average size of which is <90 nm, preferably <85 nm, preferably <80 nm, preferably <75 nm, most preferably <70 nm. The nanoparticles are obtained as a very narrow distribution of particle size (low polydispersity index): particles of sizes starting from 20-30 nm can be obtained. However, the majority of the particles generally have sizes in the range of 70 nm-100 nm. The average particle size may be tuned between 100 nm down to 70 nm or below, depending of the reaction conditions (lower temperature and more dilute conditions will favor the formation of nanoparticles of smaller average particle size). Advantageously, the process according to the invention allows the preparation of nanoparticles, the process leads to nanoparticles having a polydispersity index 0.05≤PDI≤0.5, preferably 0.05≤PDI≤0.4, most preferably 0.05≤PDI≤0.3, as calculated under ISO standard 13321:1996 E and ISO 22412:2008.

The polydispersity index is a number calculated from a simple 2 parameter fit to the correlation data (the cumulants analysis). The Polydispersity Index is dimensionless and scaled such that values smaller than 0.05 are rarely seen other than with highly monodisperse standards. Values greater than 0.7 indicate that the sample has a very broad size distribution and is probably not suitable for the dynamic light scattering (DLS) technique. The various size distribution algorithms work with data that falls between these two extremes. The calculations for these parameters are defined in the ISO standard document 13321:1996 E and ISO 22412:2008.

The process according to the invention allows the preparation of nanaoparticles that combine both a low PDI as well as small average particle size. This is particularly interesting as compared to conventional processes for the preparation of MOF particles, which do not allow to have both properties. For example, the microwave synthesis allows similar (or may be smaller) PDI but the average particles size is greater than 100 nm. Also the process of the invention is very easy to set up so it is possible to scale up at lower cost.

Accordingly, the invention also provides nanoparticles of porous crystalline Fe-, Al- or Ti-based MOF carboxylate material having a polydispersity index 0.05≤PDI≤0.5, preferably 0.05≤PDI≤0.4, most preferably 0.05≤PDI≤0.3, as calculated under ISO standard 13321:1996 E and ISO 22412:2008; and an average size <90 nm, preferably <85 nm, preferably <80 nm, preferably <75 nm, most preferably <70 nm.

Advantageously, the process according to the invention prevents the use of additives meant to solubilize the reagents in the solvent system. Typically, in conventional processes (e.g., reflux, solvothermal, microwave methodologies), additives, such as organic or inorganic bases that allow deprotonation of the linkers and thus a better solubilization, are used to help dissolution of the reagents and accelerate the reaction. Such organic or inorganic base additives may be NaOH, KOH, amines for example. Conventional processes also use organic or inorganic acids such as HF or $HNO_3$ as additives, which have an effect on the MOF crystallization process. The use of all these additives is detrimental to homogeneity of nanoparticle size, and generally leads to higher particle average size. For example, the use of acid additives, such as HF or $HNO_3$, affects the MOF crystallization process and leads to inhomogeneous microparticles. In addition, the additives must then be washed out to "clean" the MOF particle product. The process according to the invention obviates all these drawbacks in that additives e.g. for solubilizing reagents, such as acid or base additives, are not necessary.

Advantageously, the process according to the invention allows the preparation of mixed-metal MOF nanoparticles. As used herein, the term "mixed-metal" refers to MOFs that contain at least two different types of metallic centers: of different nature (different metal, e.g., Fe and Ru) or oxidation states (same metal, but different oxidation states, e.g., $Fe^{2+}$ and $Fe^{3+}$). As such, the process of the invention may involve the use of a second inorganic metallic precursor in the reaction mixture. Accordingly, step A) of the process of the invention may further comprise mixing, in addition to the first inorganic metallic precursor, a second inorganic metallic precursor, in the form of a metal $M_1$, a salt of a metal $M_1$ of formula (I) or a hydroxide or oxide of a metal $M_1$;

$$M_1Y_p \cdot nH_2O \qquad (I)$$

wherein $M_1$ is a metal selected from Cu, Fe, Co, Ni, Al, Ti, Mn, V, Cr, Ru, Sn, Mg or Nb;

Y represents $Cl^-$, $NO_3^-$, $SO_4^{2-}$, $AcO^-$, or

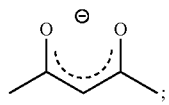

preferably the other metallic inorganic precursor is in the form of a salt of $Cu^{2+}$, $Fe^{2+}$, $Fe^{3+}$, $Co^{2+}$, $Co^{3+}$, $Ni^{2+}$, $Al^{3+}$, $Ti^{3+}$, $Ti^{4+}$, $Mn^{2+}$, $Mn^{3+}$, $Mn^{4+}$, $V^{3+}$, $V^{4+}$, $Cr^{3+}$, $Ru^{3+}$, $Ru^{4+}$, $Sn^{4+}$, $Mg^{2+}$, $Nb^{4+}$ or $Nb^{5+}$; most preferably the other metallic inorganic precursor is a metal salt such as $RuCl_3$, $VCl_3$, $SnCl_4$, $CrCl_3$ or $FeCl_3$.

As such, the process of the invention also allows the preparation of nanoparticles of porous crystalline Fe-, Al- or Ti-based MOF carboxylate material with low polydispersity index, which may be doped with one or more metals different from the principal metal present in the MOF framework (doped with Cu, Co, Ni, Al, Ti, Mn, V, Cr, Fe, Ru, Sn, Mg or Nb), or which may be doped with the same metal but with a different oxidation state (for example, $Fe^{3+}$ is the principal metal site present in the MOF, but it is doped with $Fe^{2+}$ sites).

As used herein, with respect to doping with one or more metals, the term "doping" or "doped" refers to placing other metal atoms such as Cu, Co, Ni, Al, Ti, Mn, V, Cr, Fe, Ru, Sn, Mg or Nb, in the Fe-, Al- or Ti-based MOF material lattice in place of Fe, Al or Ti atoms. The term "doping" or "doped" also refers to placing metal atoms of different oxidation state in the Fe-, Al- or Ti-based MOF material lattice in place of Fe, Al or Ti atoms (in other words introducing $Fe^{2+}$ sites in a lattice of $Fe^{3+}$ sites). For example a "Ru-doped material" is a Fe-, Al- or Ti-based MOF material according to the invention that has "implanted" Ru atoms replacing Fe, Al or Ti atoms, respectively, in the MOF material's lattice.

As such, metal ions such as $Cu^{2+}$, $Fe^{2+}$, $Fe^{3+}$, $Co^{2+}$, $Co^{3+}$, $Ni^{2+}$, $Al^{3+}$, $Ti^{3+}$, $Ti^{4+}$, $Mn^{2+}$, $Mn^{3+}$, $Mn^{4+}$, $V^{3+}$, $V^{4+}$, $Cr^{3+}$, $Ru^{3+}$, $Ru^{4+}$, $Sn^{4+}$, $Mg^{2+}$, $Nb^{4+}$ or $Nb^{5+}$, may be incorporated into the material's structure in place of Fe, Al or Ti atom metal centers. The metal doping ratio may be adjusted by using different amounts of starting metal salt to prepare the Fe-, Al- or Ti-based MOF material according to the invention (see infra).

As such, the % doping is tunable and may range from 1% to 20% of the aforementioned metal centers. Generally, the doped Fe-, Al- or Ti-based MOF material may have the same crystal structure as the pure Fe-, Al- or Ti-based MOF material (no doping). However, they may be slight differences in unit cell parameters.

For the example, if Ru is selected as the doping metal, the process of the invention allows the incorporation of a metallic precursors at room temperature. This in turn allows to obtain small particle sizes and most importantly it is possible to tune the amount of Ru at low temperature. Therefore, the process according to the invention is particularly advantageous for doping MOF nanoparticles with metal sites whose chemistry in solution is not adapted to the use of high temperatures (e.g., Ru).

In a variant, the process of the invention may be carried out in the presence of particles of a material different from a MOF. This enables the preparation of core-shell particles where the core is made of the material different from a MOF, encapsulated within a shell made of MOF.

Accordingly, in a variant, there is provided a microwave-free process for preparing core-shell particles having a shell made of porous crystalline Fe-, Al- or Ti-based MOF carboxylate material, with low polydispersity index, comprising a step of reacting a mixture consisting of:

A. an aqueous solvent system;
B. at least a first inorganic metallic precursor in the form of a metal M, a salt of a metal M or a coordination complex comprising the metal ion $M^{2+}$ selected from $Fe^{2+}$, $Fe^{3+}$, $Ti^{3+}$, $Ti^{4+}$ or $Al^{3+}$; and
C. at least one precursor ligand L' having the structure $R_1—(C(=O)—R_3)_q$ wherein:
   q represents an integer from 2 to 6; preferably q represents 2, 3 or 4;
   each occurrence of $R_3$ is independently selected from a halogen atom, —OH, —$OR_4$, —O—C(=O)$R_{3A}$ or —$NR_{3A}R_{3B}$, wherein $R_{3A}$ and $R_{3B}$, identical or different, represent $C_{1-12}$ alkyl radicals;
   $R_1$ independently represents:
   (a) a $C_{1-12}$alkyl, $C_{2-12}$alkenyl or $C_{2-12}$alkynyl radical;
   (b) a fused or non-fused monocyclic or polycyclic aryl radical, comprising 6 to 50 carbon atoms;
   (c) a fused or non-fused monocyclic or polycyclic heteroaryl, comprising 4 to 50 carbon atoms;
   $R_1$ optionally bearing one or more substituents independently selected from a halogen atom, —OH, —$NH_2$, —$NO_2$ or $C_{1-6}$alkyl; and
D. particles, preferably nanoparticles, of a material different from a MOF, preferably nanoparticles of a metal oxide;

at a temperature below the boiling point temperature of the aqueous solvent system, preferably at least 10° C. below the boiling point temperature of the aqueous solvent system; so as to obtain the said nanoparticles.

In particular, the process is advantageously carried out in the absence of additives aimed at solubilizing the at least one ligand precursor L' in the solvent system, such as base additives, or additives that may affect the MOF crystallization process, such as acid additives.

Advantageously, the particles of a material different from a MOF are nanoparticles, and the core-shell particles are core-shell nanoparticles. For example, the process may be carried in the presence of particles of a metal oxide, to produce core-shell nanoparticles where the metal oxide core is encapsulated within a MOF shell. For example, the metal oxide may be iron oxide, preferably iron III oxide. As such, the process of the invention may be used to encapsulate (nano)particles of contrast agent (e.g. iron oxide) within a MOF shell. Therefore, the process of the invention is particularly advantageous for encapsulating materials that are sensitive/fragile to the reaction conditions of the conventional processes for preparing MOF materials (e.g., high temperatures (reflux, solvothermal), or microwave). Owing to the mild reaction conditions of the process of the invention (low temperature, absence of microwave), the process may be carried out in the presence of fragile materials, and may prove particularly useful as a method for encapsulating fragile materials, such as metal oxides.

Accordingly, there is also provided core-shell nanoparticles comprising a metal oxide core (e.g., iron oxide core) encapsulated within a MOF shell, wherein the MOF is as defined herein and above. These nanoparticles may advantageously be used as a contrast agent usable in medical imaging. They may also find applications in hyperthermia therapy, particularly core-shell composites comprising an iron oxide core, as the iron oxide could induce a local heating, when an external alternating magnetic field is applied.

As used herein, the term "hyperthermia therapy" refers to medical treatment in which body tissue is exposed to higher temperatures in an effort to treat a disease or condition that responds to such treatment, such as cancer.

As such, core-shell nanoparticles comprising a metal oxide core (e.g., iron oxide core) encapsulated within a MOF shell, wherein the MOF is as defined herein and above, may be advantageously useful for the treatment of cancer. They inherently have encapsulation and release properties of active therapeutic molecules, and thus can be loaded with one or more anti-cancer drugs for release in the patient to be treated. In addition, when the core is made up of a metal oxide with magnetic properties, such as iron oxide, the core-shell nanoparticles can be additionally or alternatively used in hyperthermia therapy for the treatment of various cancers. They may be useful for local, regional and/or whole-body hyperthermia therapy. Local hyperthermia heats a very small tissue area and is typically used for cancers near or on the skin or near natural openings in the body (e.g., the mouth). However, core-shell nanoparticles according to the invention may be designed to target specific tissues and/or cancer cells, and therefore heat may be applied locally at the site needing treatment (not necessarily near or on the skin or near natural openings in the body) by application of an external alternating magnetic field. Regional hyperthermia heats a larger part of the body, such as an entire organ or limb. Whole-body hyperthermia heats the entire body to temperatures of about 39 to 43° C., or even higher temperatures. It is typically used to treat metastatic cancer. Core-shell nanoparticles according to the invention may be used in combination with usual techniques for whole-body hyperthermia treatment, to ensure application of the desired body temperature. Overall, the goal of hyperthermia therapy is to kill the tumor by heating it without damaging anything else, or to weaken cancer cells so that they are more likely to be killed by radiation and chemotherapeutic medications. Hyperthermia can kill cancer cells directly, but it may be more advantageously used in combination with other treatments for cancer (hyperthermia increases blood flow to the warmed area, thereby increasing perfusion in tumors and in normal tissue. This enhances the delivery of medications). Because of their structure and encapsulation/release properties, core-shell nanoparticles according to the invention may be used for dual hyperthermia therapy and delivery of anti-cancer drugs.

Advantageously, the process according to the invention further comprises a step of introducing at least one pharmaceutically active principle, a compound of cosmetic interest or a marker into said porous MOF material.

Thus, the invention also relates to the use of MOF nanoparticles according to the invention, said nanoparticles comprising in their pores or at their surface at least one molecule chosen from the group comprising a pharmaceutically active principle, a compound of cosmetic interest or a marker.

In particular, the invention also relates to the use of MOF nanoparticles according to the invention loaded with pharmaceutically active principle as a medicament. The pharmaceutically active principle may be contained either in the pores or at the surface of the nanoparticle according to the invention. This is what is understood in the rest of this document by the expression "nanoparticle loaded with pharmaceutically active principle".

More generally, the term "nanoparticle loaded with component X" refers to a nanoparticle according to the invention containing in its pores or at its surface the component X. The component X may be adsorbed or bound by covalent bonding, by hydrogen bonding, by Van der Waals bonding, by electrostatic interaction at the surface or in the pores of the nanoparticle. This component X may be, as indicated above, a pharmaceutically active principle. Alternatively, component X may be any molecule with biological activity, a compound of cosmetic interest or a marker.

Specifically, the MOF nanoparticles according to the invention have the advantage of having large adsorption capacities. In addition, they can efficiently adsorb pharmaceutical molecules that have particular encapsulation difficulties, for example on account of their instability, their high reactivity, their poor solubility, their strong tendency to crystallize, their hydrophilic or amphiphilic nature, etc.

For example, the nanoparticle according to the invention may be loaded with at least one pharmaceutically active principle that has one or more of the following characteristics: hydrophilic, amphiphilic, lipophilic, unstable, toxic, strong tendency to crystallize or substantially insoluble.

The term "toxic" refers to a pharmaceutically active principle that has toxic effects liable to hinder its use in medical or veterinary applications. They may be, for example, alkylating agents such as busulfan, cisplatin or nitrosoureas such as lomustine.

The term "strong tendency to crystallize" refers to a pharmaceutically active principle that has a tendency to self-associate in a crystal lattice instead of being included in other structures. Thus, such a compound tends to form crystals during the encapsulation process used, rather than being included in particles. This thus gives at the end of the process a mixture of particles that are poorly loaded with pharmaceutically active principles and crystals thereof. It may be, for example, busulfan. At high dose, it has a serious side effect, namely veno-occlusive liver disease. This probably results from the very strong tendency of this molecule to crystallize. The crystal stacking is governed by strong dipole-dipole interactions between the methylsulfonate groups of this active principle.

The term "substantially insoluble" refers to a pharmaceutically active principle whose solubility is less than 0.1 mg/ml in water. It may be, for example, busulfan.

The term "unstable" refers to a pharmaceutically active principle that can decompose, crystallize and/or react and in so doing lose its structure and its activity. A possible example of this is busulfan.

In addition, the pharmaceutically active principle may be any molecule that has biological activity, for instance a medicament, especially an anticancer agent, an antiviral agent, a modified or unmodified nucleoside analog, a nucleic acid, an antibody, a protein, a vitamin, etc.

Among the amphiphilic active principles that may be mentioned, for example, are busulfan, doxorubicin chloride and imipramine chloride.

Among the lipophilic active principles that may be mentioned, for example, are tamoxifen, docetaxel, paclitaxel, ibuprofen, lidocaine, liposoluble vitamins such as vitamins A (retinol), D (calciferol), E (tocopherol), K1 (phylloquinone) and K2 (menaquinone).

In particular, the nanoparticle according to the invention may be loaded with at least one pharmaceutically active principle chosen, for example, from the group comprising taxotere, busulfan, azidothymidine (AZT), azidothymidine phosphate (AZTP), cidofovir, gemcitabine and tamoxifen.

Advantageously, the active principle may be a fluorescent molecule. For example, it may be rhodamines, fluorescein, luciferase, pyrene and derivatives thereof, or aminopyrrolidino-7-nitrobenzofurazan.

Advantageously, the active principle may be a fluoro molecule, i.e. a molecule comprising at least one substituent F. It may be, for example, one of the fluoro molecules mentioned previously. These fluoro molecules are suitable for use in imaging, particularly fluorescence imaging such as the abovementioned PET technique.

Thus, the invention also relates to the use of MOF nanoparticles encapsulating one or more fluoro molecules according to the invention, as marker that may be used in medical imaging, such as PET imaging.

In addition, the nanoparticle according to the invention may be loaded with at least one compound of cosmetic interest.

The term "compound of cosmetic interest" refers to any active substance included in the formulation of a cosmetic preparation, i.e. a preparation intended to be placed in contact with various surface parts of the human body, especially the epidermis, the pilous and hair systems, the external organs, the teeth and mucous membranes, for the purpose, exclusively or mainly, of cleaning, protecting or fragrancing them, maintaining the human body in good condition, modifying its appearance or correcting its odor. The term "active substance" refers to a substance that ensures the efficacy of the cosmetic preparation.

The compound of cosmetic interest may be an active substance included in the preparation of any cosmetic preparation known to those skilled in the art, for example hygiene products (e.g. makeup remover, toothpaste, deodorant, shower gel, soap or shampoo), care products (e.g. anti-wrinkle cream, day cream, night cream, moisturizing cream, floral water, scrub, milk, beauty mask, lip balm or tonic), haircare products (e.g. hair conditioner, relaxer, gel, oil, lacquer, mask or dye), makeup products (e.g. concealer, self-tanning product, eyeliner, makeup powder, foundation, kohl, mascara, powder, skin bleaching product, lipstick or nail varnish), fragrances (e.g. eau de Cologne, eau de toilette or fragrance), antisun products (e.g. after-sun and antisun creams, oils and lotions), shaving products and hair-removing products (e.g. aftershave, hair-removing cream or shaving foam) or bath and shower preparations (e.g. bubble bath, bath oil or bath salts).

According to the invention, the compound of cosmetic interest may be chosen, for example, from the group comprising:
  an antioxidant (for example citric acid, beta-carotene, vitamin E, glycolic acid, glutathione, vitamin C, polyphenols, lycopene, flavonoids, tannins, anthocyans, N-acetylcysteine (free-radical scavenger))
  a vitamin (for example vitamin A, B3, B5, B6, B2, B1, B9, B8, B12, C, E, D, K, K1, K2)
  a liporegulator (for example caffeine or theophylline)
  a photoprotective agent (for example benzophenone-3 (2-hydroxy-4-methoxybenzophenone), benzophenone-4 (2-hydroxy-4-methoxybenzophenone-5-sulfonic acid), 2-phenylbenzimidazole-5-sulfonic acid)
  a moisturizer (for example urea, hyaluronic acid or sorbitol).

For example, the nanoparticle according to the invention may be loaded with at least one compound of cosmetic interest chosen from the group comprising benzophenone, visnadine, salicylic acid, ascorbic acid, benzophenone and derivatives thereof, caffeine, urea, hyaluronic acid, etc.

In general, the Fe-, Al- or Ti-based MOF carboxylate nanoparticles according to the present invention may be used for any known application of these MOFs.

Due to the small particle size and high polydispersity index, the Fe-, Al- or Ti-based MOF carboxylate nanoparticles according to the present invention may be particularly useful in nanomedicine.

Due to their structural features, the Fe-, Al- or Ti-based MOF carboxylate nanoparticles according to the present invention may be used as a catalyst support for carrying out heterogeneously catalyzed chemical reactions, or as a gas storage/separation/purification material, or as a matrix for encapsulating active principles (medicaments, cosmetics), or as a photochromic material for information storage, laser printing or as an oxygen indicator, or as proton conductive material (fuel cells), or a optoelectronic material (photovoltaic cells including Gratzel cells), or else as sensing material.

In general, the Fe-, Al- or Ti-based MOF carboxylate nanoparticles according to the invention may be used as catalyst support for carrying out heterogeneously catalyzed chemical reactions, or as gas storage/separation/purification material, or as matrix for encapsulating active principles (medicaments, cosmetics).

Advantageously, mixed-metal MOF nanoparticles obtainable by the process according to the invention, especially those mixed-metal MOF nanoparticles containing a catalytically active metal sur as Ru, may be used as a catalyst support for carrying out heterogeneously catalyzed chemical reactions.

The reader may refer to the indicated literature references for guidance as to how the Fe-, Al- or Ti-based MOF carboxylate materials of the invention may be used in the various applications of interest:
  Heterogeneous catalysis, particularly photocatalysis [3]
  Gas storage [4]
  Separation of fluids [5]
  Fuel-cells (proton conductive materials) [6]
  Optoelectronics (Photovoltaics . . . ) [7]
  Sensing [8]
  Biomedicine, health-care, cosmetics [9]

As nonlimiting examples, the solid material in accordance with the present invention more particularly being used:
  for the adsorption of greenhouse gases ($CO_2$, $CH_4$), in the presence of various contaminants (water, $N_2$, CO, $H_2S$, etc.) in processes for capturing flue gases from factories (steelworks, cement works, thermal power plants, etc.), from units for producing methane or hydrogen from the combustion of biomass or the gasification of coal, The low production cost of these materials, combined with their non-toxicity and their good stability (thermal stability, moisture resistance or resistance to dihydrogen sulfide) makes them the candidates of choice for large-scale applications of this type;
  for the separation of fluids (gases, vapors, liquids) such as the separation of aromatic compounds (isomers of xylene), of branched alkanes (octane number), of biomass derivatives (phenols . . . ), the purification of fuels, etc.;
  in biology/medicine/cosmetics, for the adsorption or encapsulation of active (pharmaceutical or cosmetic) principles of interest for the purpose either of releasing them in a controlled manner in order to provide doses at an effective level therapeutically for a suitable period, or of protecting them with respect to the outside environment (from moisture for example). As such, Fe, Al and Ti are metals that are not very toxic in the same way as carboxylic acids in general, which gives these solids (Fe-, Al- or Ti-based MOFs) an a priori low toxicity that is very advantageous for this type of application. Its very high chemical stability might particularly be of interest to prevent from a fast release of the cargos. The UV adsorption properties of Fe, Al and Ti may be applied to the field of UV-screening substances used in cosmetics, in particular with a suitable choice of organic spacer that itself also adsorbs in this wavelength range. The solid materials in accordance with the invention may also be used for the removal of toxins, for detoxification (for eliminating a posteriori toxins in the body), or for purifying biological fluids (urine, blood, etc.).

As a whole the Fe-, Al- or Ti-based MOF nanoparticles and process for making them, according to the present invention possess several unique chemical and structural features as summarized below:

- Green solvent, mild reaction conditions (low temperature, no reflux, not microwave), easy to scale-up, cost effective.
- Access to nanoparticles that combine both low PDI and low average particle size.
- Possibility to work in the presence of materials that are sensitive/fragile to the reaction conditions of the conventional processes for preparing MOF materials (e.g., high temperatures (reflux, solvothermal), or microwave).
- Particularly useful as a method for encapsulating fragile materials, such as metal oxides.
- Advantageous for doping MOF nanoparticles with metal sites whose chemistry in solution is not adapted to the use of high temperatures (e.g., Ru).
- Allows access to brand new MOF phases that cannot be prepared by the conventional higher energy methods (reflux, solvothermal, microwave methodologies).
- Avoids the use of additives meant to solubilize reagents in the solvent system.
- Avoids the use of reflux conditions, and specialized equipment (reflux condenser).
- Avoids the use of extensive/repeated washes, notably with organic solvents such as alcohols. A simple water rinse suffices and the MOF nanoparticles obtained by the process of the invention can be used as is.

Other advantages may also emerge to those skilled in the art upon reading the examples below, with reference to the attached figures, which are provided as nonlimiting illustrations.

EQUIVALENTS

The representative examples that follow are intended to help illustrate the invention, and are not intended to, nor should they be constructed to, limit the scope of the invention. Indeed, various modifications of the invention and many further embodiments thereof, in addition to those shown and described herein, will become apparent to those skilled in the art from the full contents of this document, including the examples which follow and the references to the scientific and patent literature cited herein. For example, the reader may refer to WO 2009/077670 and WO 2009/077671 for background on conventional synthetic methods for preparing MOFs, in particular POF carboxylate materials. [1, 2] These references are also useful for guidance on post-synthetic modifications of MOF materials (e.g., grafting, surface modification), which may be adapted in the context of the present invention.

It should further be appreciated that the contents of those cited references are incorporated herein by reference to help illustrate the state of the art.

The following examples contain important additional information, exemplification and guidance that can be adapted to the practice of this invention in its various embodiments and the equivalents thereof.

EXAMPLES

The Fe-, Al- or Ti-based materials according to the present invention and their preparation can be understood further by the examples that illustrate some of the processes by which these conjugates are prepared or used. It will be appreciated, however, that these examples should not be construed to limit the invention. Variations of the invention, now known or further developed, are considered to fall within the scope of the present invention as described herein and as hereinafter claimed.

Example 1—Preparation of MIL-100(Fe) Nanoparticles at Room Temperature

Trimesic acid (0.25 g, 1.19 mmol) was added to water (90 ml) followed by the addition of iron(III)nitrate nonahydrate (0.72 g, 1.78 mmol), producing a cloudy yellow solution which was stirred at room temperature at 300 rpm for 48 h. The reaction mixture was removed after a period of 48 h, and the product was filtered under suction, and washed with water (50 ml), to yield an orange brown solid. No further wash beyond the simple water rinse was needed: the MOF nanoparticles obtained could be used as such.

Example 2—Preparation of MIL-100(Fe) Nanoparticles at 60° C.

Trimesic acid (0.25 g, 1.19 mmol) was added to water (90 ml) followed by the addition of iron(III)nitrate nonahydrate (0.72 g, 1.78 mmol), producing a cloudy yellow solution which was stirred at 60° C. at 300 rpm for 48 h. The reaction mixture was removed after a period of 48 h, and the product was filtered under suction, and washed with water (50 ml) to yield an orange brown solid. No further wash beyond the simple water rinse was needed: the MOF nanoparticles obtained could be used as such.

Comparative Example 3—Preparation of MIL-100(Fe) Nanoparticles Under Reflux

Trimesic acid (0.25 g, 1.19 mmol) was added to water (90 ml) followed by the addition of iron(III)nitrate nonahydrate (0.72 g, 1.78 mmol), producing a cloudy yellow solution which was stirred under reflux at 300 rpm for 48 h. The reaction mixture was removed after a period of 48 h, and the product was filtered under suction, and washed with water (50 ml) and with ethanol (90 ml), to yield an orange brown solid.

Figure 19:
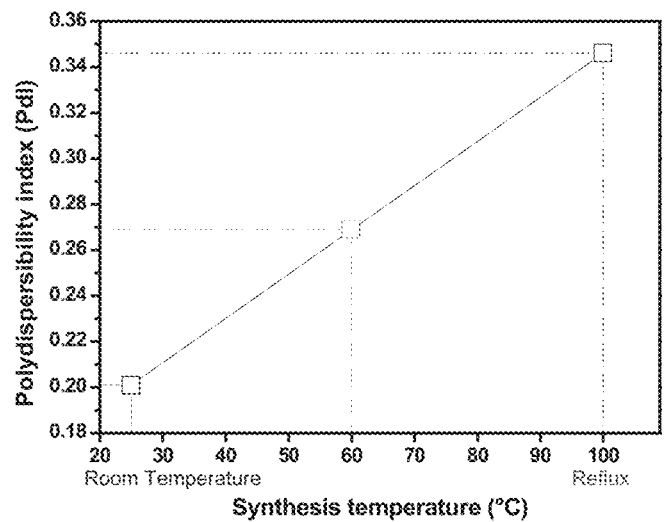
FIG. 19 shows a graph representing the polydispersibility index values of MIL-100(Fe) nanoparticles obtained at room temperature, 60° C., and under reflux, respectively.

As shown in FIG. 19, the polydispersity index of the MIL-100(Fe) nanoparticles obtained according to the process of the invention (room temperature and 60° C.) is much lower than MIL-100(Fe) nanoparticles obtained under a conventional process (reflux). This is confirmed by the findings reported in Zhang et al., Chemical Engineering Journal, vol. 259, 2014, pp. 183-190, in which a MIL-100 (Fe) MOF is prepared in water under reflux without base or acid additives: large particles with high polydispersity index are obtained, as evidenced by SEM (Figure S1 of the article's Supplementary Material).

Table 1 compiles the calculated BET surface area of untreated and the KF-treated MIL-100(Fe) nanoparticles synthesised in Example 1 (room temperature) using $N_2$ isotherms. These were compared with BET surface area results of MIL-100(Fe) found when using microwave and solvothermal routes.

TABLE 1

| Synthesis conditions | SBET/m²g⁻¹ |
| --- | --- |
| Room temperature, rinced with 50 ml H₂O, Untreated | ~1800 |
| Room temperature, rinced with 50 ml H₂O, KF-treated | ~1900 |
| Microwave untreated[i] | 1350 |
| Microwave KF-treated | ~1550 |
| Solvothermal[ii] (microparticles) | ~1900 |

[i]A. García Márquez, A. Demessence, A. E. Platero-Prats, D. Heurtaux, P. Horcajada, C. Serre, J.-S. Chang, G. Férey, V. A. de la Peña-O'Shea, C. Boissière, D. Grosso and C. Sanchez, Eur. J. Inorg. Chem., 2012, 2012, 5165-5174.
[ii]P. L. Llewellyn, S. Bourrelly, C. Serre, A. Vimont, M. Daturi, L. Hamon, G. De Weireld, J.-S. Chang, D.-Y. Hong, Y. Kyu Hwang, S. Hwa Jhung and G. Férey, Langmuir, 2008, 24, 7245-7250.

The results show that the low temperature process according to the invention, in addition to being a handy (easy to put to practice) and cost-effective method (no additives needed, and no extensive washing necessary), leads to the preparation of MOF nanoparticles with higher surface areas to those obtained with existing conventional methods to build MOF nanoparticles (microwave synthesis). In particular, the surface area obtained without the extra washing step with EtOH is about 1800 m²/g, which is close to the surface area obtained for microparticle.

Example 4—Preparation of MIL-100(Fe) Core-Shell Nanoparticles Encapsulating Iron Oxide as Contrast Agent The low temperature synthesis condition which precludes the use of additive allows the easy preparation of core-shell composites such as iron oxides@MIL-100(Fe). Such composites can be used in theranostic as nanocarriers for drug delivery and contrast agents for Magnetic Resonance Imaging. These composites can also be used for hyperthermia therapy, particularly core-shell composites such as iron oxides@MIL-100(Fe), as the iron oxides can induce a local heating, when an external alternating magnetic field is applied.

As used herein, the expression "X@MOF" refers to core-shell nanoparticles of MOF (shell) encapsulating a core made of X. As such, "iron oxides@MIL-100(Fe)" refers herein to core-shell iron oxides@MIL-100(Fe) composites.

Prior to the preparation of the core-shell iron oxides@MIL-100(Fe) composites, iron oxides nanoparticles were first synthesized by a coprecipitation method. 20 mL of sodium hydroxide (15 mol. L⁻¹) were added under vigorous stirring to an acidic aqueous solution of $FeCl_3 \cdot 6H_2O$ (20 mL, 1 mol·L⁻¹) and $FeCl_2 \cdot 4H_2O$ (5 mL, 2 mol·L⁻¹ in HCl 2 mol·L⁻¹). The black precipitate was isolated by magnetic settling and washed with 20 mL of water. After a magnetic separation, the precipitate was then stirred for 15 min in 30 mL of $HNO_3$ (2 mol·L⁻¹). For a complete oxidation of magnetite to maghemite nanoparticles (herein referred to as "NPs"), the precipitate obtained after a magnetic separation was then mixed with 10 mL of $Fe(NO_3)_3 \cdot 9H_2O$ (0.35 mol·L⁻¹) at 80° C. for 30 min. The isolated precipitate was peptised in water and a colloidal solution was obtained.

The iron oxide@MIL-100(Fe) composites were then prepared by adding under stirring the colloidal solution containing 70 mg of iron oxides to an aqueous solution $Fe(NO_3)_3 \cdot 9H_2O$ (70 mL, 0.025 mol·L⁻¹). 250 mg of trimesic acid were then added and the reaction was allowed to stir for 24 hours at room temperature (20-23° C.).

The brown precipitate was isolated by magnetic settling and then centrifuged at 14500 rpm for 10 min. The solid was then washed by one centrifugation/redispersion cycle in water followed by three centrifugation/redispersion cycles in absolute ethanol. The $\gamma$-$Fe_2O_3$@MIL-100(Fe) NPs were stored in EtOH and could be redispersed in water before use.

Figure 20:
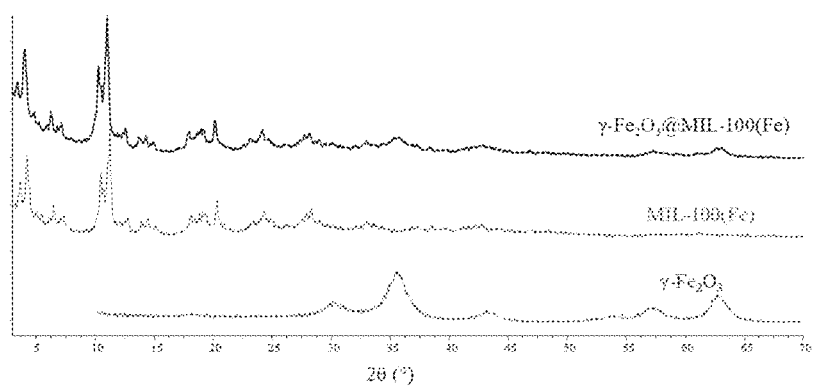
FIG. 20 shows powder X-ray diffraction (PXRD) patterns of γ-$Fe_2O_3$@MIL-100(Fe) prepared according to Example 4, and as a comparison, a PXRD of MIL-100(Fe) and γ-$Fe_2O_3$. PXRD were collected in a Siemens D5000 diffractometer (6-29) using Cu Kα radiation (λ=1.5418 Å).

X-ray diffraction analysis confirm the well synthesis of MIL-100(Fe) phase in presence of $\gamma$-$Fe^2O_3$. The structural integrity of $\gamma$-$Fe^2O_3$ is also preserved upon their association (FIG. 20).

Combination of MIL-100(Fe) with iron oxides is also confirmed by TEM analysis showing that $\gamma$-$Fe_2O_3$ NPs are embedded in the MIL-100(Fe) phase. No aggregates of iron oxides alone were observed using TEM analysis (FIGS. 21A, 21B, 21C, 21D).

Nanoscale $\gamma$-$Fe_2O_3$@MIL-100(Fe) composites were also observed with sizes varying from 50 to 150 nm. This is in line with the DLS measurements with an average hydrodynamic diameter found around 150 nm with a polydispersity index at 0.2 (FIG. 22). $\gamma$-$Fe_2O_3$@MIL-100(Fe) composites were also characterized by FT-Infrared.

Figure 23:
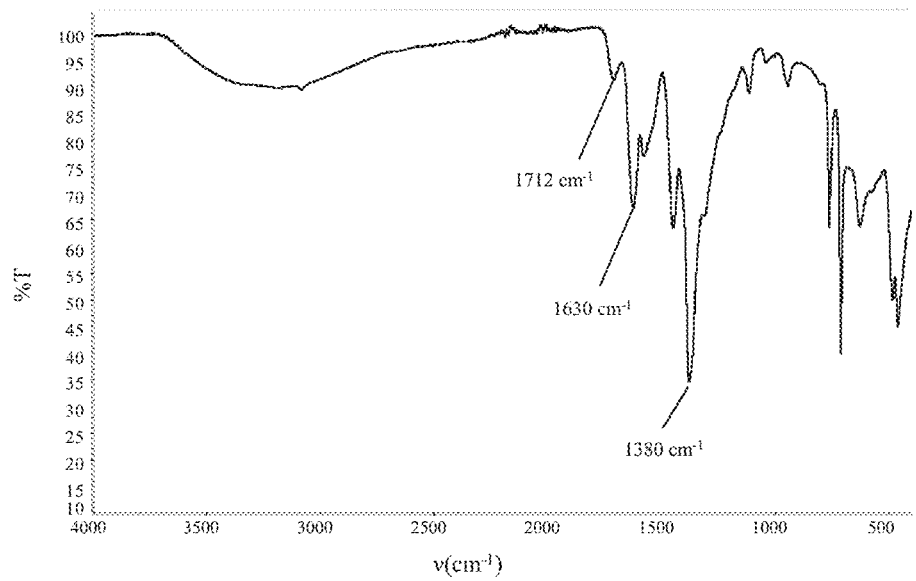
FIG. 23 shows an FT-IR spectrum of γ-$Fe_2O_3$@MIL-100 (Fe) NPs prepared in Example 4.

Different stretching vibration bands are observed. The bands at 1631 and 1384 cm-1 correspond to the stretching vibration bands of the carboxylate linked to the iron of the MOF while free ligand is observed through the C═O stretching vibration band at 1716 cm-1 (FIG. 23).

Figure 24:
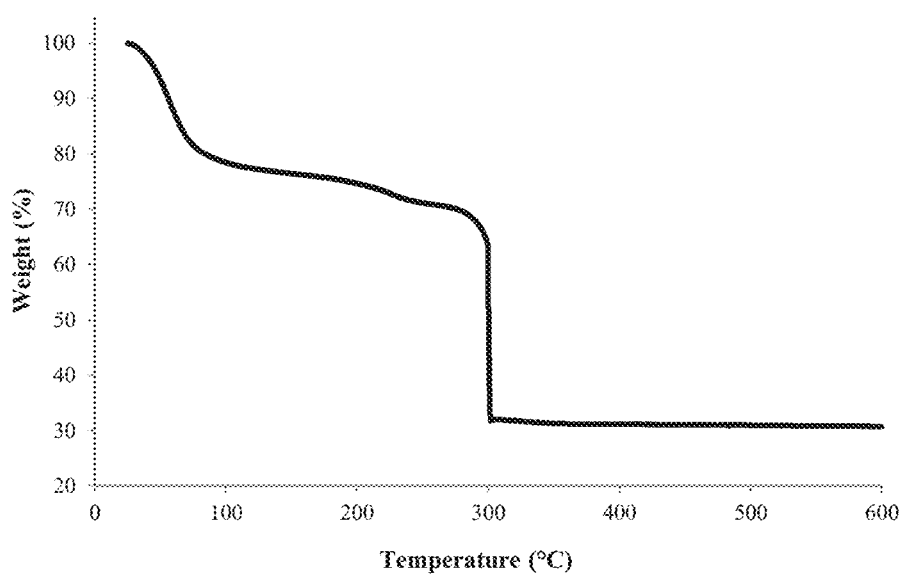
FIG. 24 shows a thermal gravimetric analysis plot of γ-$Fe_2O_3$@MIL-100(Fe) NPs prepared in Example 4. TGA were performed on a Perkins Elmer SDA 6000 apparatus. Solids were heated up to 600° C. with a heating rate of 2° $C.min^{-1}$ in an oxygen atmosphere.

Using thermogravimetric analysis the weight content of iron oxides in $\gamma$-$Fe_2O_3$@MIL-100(Fe) composites was estimated to 20±2 wt % (FIG. 24).

Figure 25:
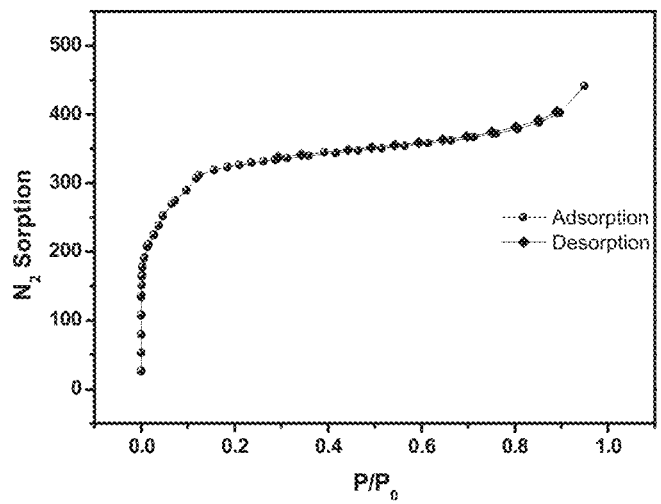
FIG. 25 shows $N_2$ adsorption (dots) and desorption (diamonds) isotherms of γ-$Fe_2O_3$@MIL-100(Fe) NPs prepared in Example 4 at 77 K (PO=1 atm). $N_2$ sorption isotherms were obtained at 77 K using a Belsorp Mini (Bel, Japan). Prior to the analysis, approximately 40-60 mg of activated sample was evacuated for 3 h at 120° C. under primary vacuum. Brunauer-Emmett-Teller (BET) surface and pore volume were estimated at a relative pressure lower than 0.25.

The $\gamma$-$Fe^2O_3$@MIL-100(Fe) composites present also a BET specific surface area of 1174 m2·g-1 obtained using N2 adsorption desorption. When normalized with the weight of MIL-100(Fe), a value of 1486 m2·g-1 is obtained, in line with the BET specific surface area of MIL-100(Fe) alone (FIG. 25).

Figure 26:
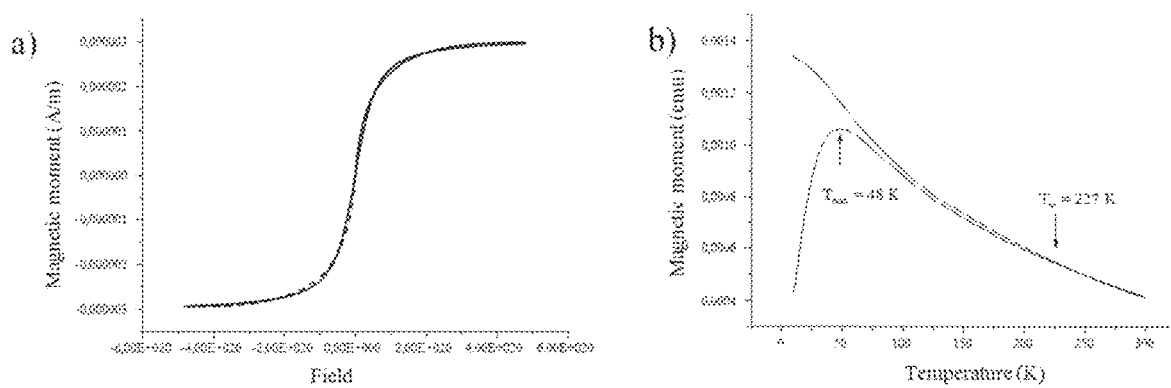
FIG. 26 shows a) Mass magnetization cycles of γ-$Fe_2O_3$@MIL-100Fe composite of Example 4 at T=300 K (dotted line) and Langevin fit (solid line) of the magnetization; b) Magnetic moments of γ-$Fe_2O_3$@MIL-100Fe composite of Example 4 measured under an applied magnetic field of 200 Oe after zero field cooling then field cooling. The magnetic moment was measured by a Quantum Design vibrating sample magnetometer (VSM).

Magnetisation measurements of $\gamma$-$Fe_2O_3$@MIL-100(Fe) were undertaken in order to determine its saturation magnetisation and to gain insight into the influence of MIL-100 (Fe) on the superparamagnetic properties of $\gamma$-$Fe_2O_3$. A value of 68 A·m²/kg was obtained for saturation magnetisation of $\gamma$-$Fe_2O_3$@MIL-100(Fe) in line with the 53 A·m²/kg value obtained for pure $\gamma$-$Fe_2O_3$ NPs. Such results showed that the combination of both components does not have any impact on the magnetic properties of the $\gamma$-$Fe_2O_3$ core (FIG. 26). $\gamma$-$Fe_2O_3$@MIL-100(Fe) can be used for hyperthermia therapy and/or MRI imaging.

The efficiency of MRI contrast agents based on iron oxides is usually assessed by measuring the $T_2$ (transverse) relaxation times of the proton spins relaxations. Then the relaxation rate $1/T_2$ is plotted versus total iron concentration and the resulting slope (mM⁻¹·s⁻¹) provides the value of r2 relaxivity.

Figure 38:
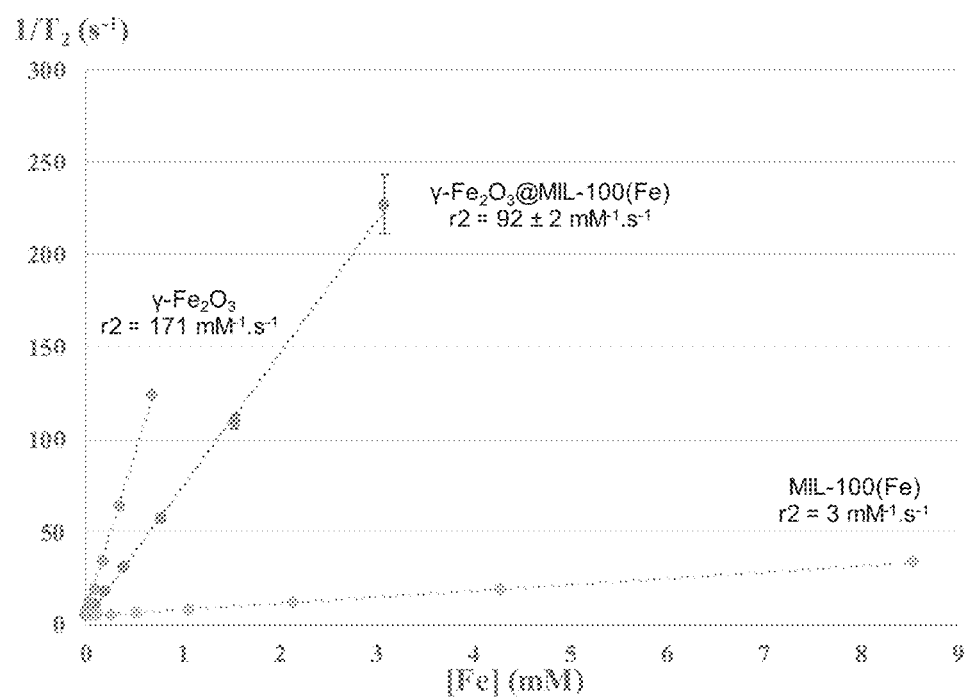
FIG. 38 shows relaxation measurements of γ-$Fe_2O_3$, MIL-100(Fe) and γ-$Fe_2O_3$@MIL-100(Fe) NPs at different concentrations in simulated physiological serum conditions PBS (phosphate buffer saline) and BSA (Bovine Serum Albumine). The relaxivity values (r2) are extracted from the slope of the curve.

When loaded with iron oxides NPS, the composites $\gamma$-$Fe_2O_3$@MIL-100(Fe) showed a good relaxivity value (92 s⁻¹·mM⁻¹) which make them suitable for their use as contrast agent for MRI (Magnetic Resonance Imaging). Cf. FIG. 38.

Overall, such $\gamma$-$Fe_2O_3$@MIL-100(Fe) nanoparticles can be used in Theranostics as they have encapsulation and release properties of active therapeutic molecules but also can be used as contrast agents to perform MRI due to their relaxometric properties, and for anti-cancer treatment by hyperthermia therapy, or by dual hyperthermia therapy and delivery of anti-cancer drugs.

Example 5—Preparation of Heterometallic MIL-100(Fe/Ru) Nanoparticles (Inclusion of Catalytically Reactive Species within Metal Carboxylate MOFs)

The introduction of catalytically active Ruthenium species in MOF structures is currently of foremost interest in the field of heterogeneous catalysis as reflected by the increasing number of publications devoted to this aim. Some reported examples are based on post-synthetic modification (PSM) of pre-formed MOFs to incorporate the Ru species in the framework by partial ligand exchanges with the corresponding metallo-ligand or by post-synthetic ion metathesis, giving rise to the desired Ru-doped MOF. Another existing approach for the synthesis of mixed-metal MOFs consists in the secondary building unit (SBU) approach for the preparation of the parent mixed-metal compound MIL-127(Fe$_2$M) (M=Ni, Co, Mg).

Quite advantageously, the low temperature method according to the present invention permits not only to introduce Ruthenium species into the nanoMOF structure but also to tune the Fe/Ru ratio by simply modifying the metal content in the initial reaction mixture.

Generally speaking, an exemplary experimental procedure for the synthesis of heterometallic MIL-100(Fe/M) nanoparticles according to the invention follows the room temperature method described in Example 1 for the MIL-100(Fe) nanoparticle material. As an example, this green (environment-friendly) method consists essentially in a one-pot reaction in water and at room temperature, containing the ligand and the metal precursor in stoichiometric amounts. The choice of the metal precursor as well as the appropriate concentration in the reaction mixture are both important parameters for the successful preparation of nanostructured MIL-100(Fe). This approach has been extended to produce mixed-metal nanoMOF, in particular heterometallic MIL-100(Fe/Ru) nanoparticles.

In a round bottom flask, a mixture of 168 mg of trimesic acid (0.8 mmol) with 320 mg of Fe(NO$_3$)$_3$.9H$_2$O (0.8 mmol) and 83 mg of RuCl$_3$ (0.4 mmol) in 90 mL of distilled H$_2$O was prepared. The solution was then stirred at 300 rpm for 48 hours at room temperature with the formation of a cloudy orange-yellow suspension. Then, the final suspension was filtrated and the obtained powder washed thoroughly with water. Different amounts of Ruthenium were introduced into the framework by modifying the Fe/Ru metal ratio content in the initial reaction mixture. The solids were then dispersed in 90 mL of EtOH and stirred for 12 hours at 60° C. to remove the excess of trimesic acid obtaining orange-brown solids.

All reactions were carried out following a high-throughput methodology where all parameters (concentration of reagents, T, stirring, reaction time . . . ) were kept constant with the unique variable being the Fe/Ru metal ratio.

Figure 27:
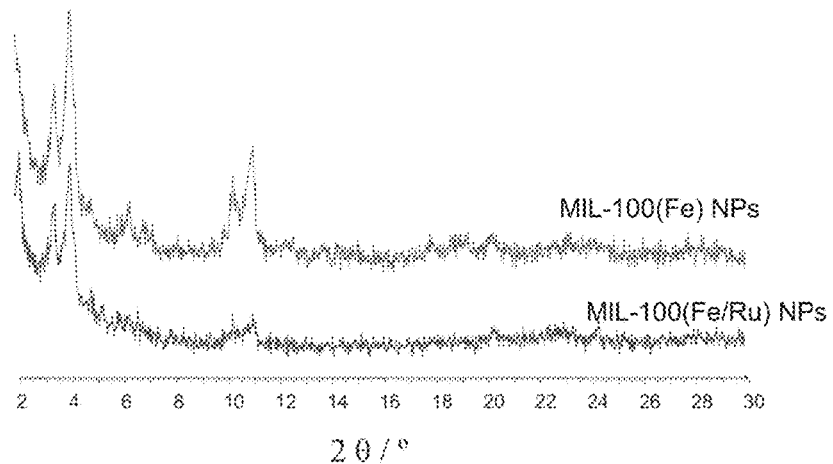
FIG. 27 shows powder X-ray diffraction (PXRD) patterns of MIL-100(Fe) nanoparticles prepared according to Example 1 (top) and MIL-100(Fe/Ru) nanoparticles prepared according to Example 5 (bottom) (sample 2) obtained at room temperature.
Figure 28:
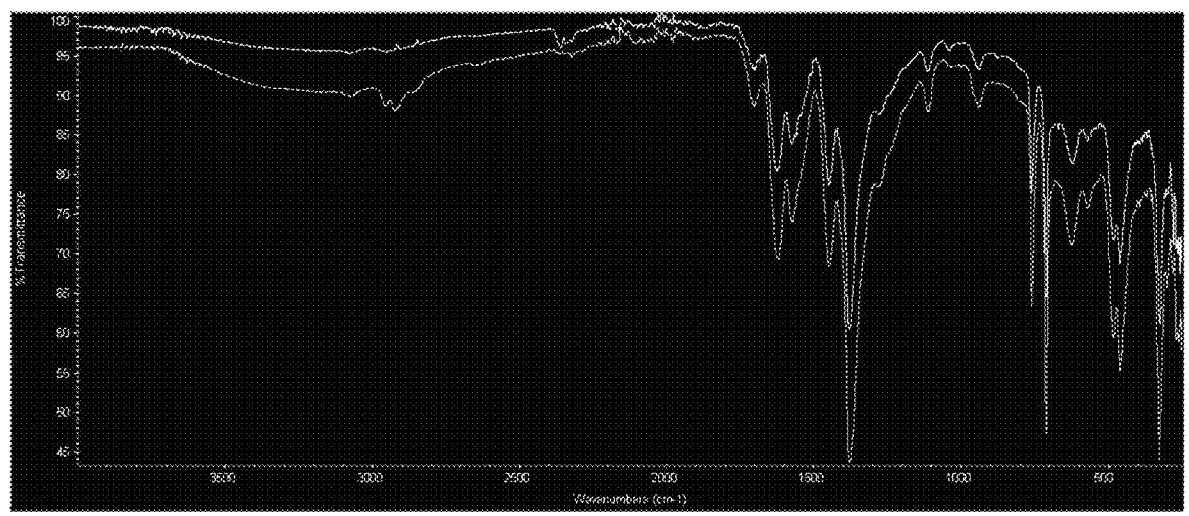
FIG. 28 shows FTIR spectra of MIL-100(Fe) nanoparticles prepared according to Example 1 (bottom spectrum) and MIL-100(Fe/Ru) nanoparticles prepared according to Example 5 (top spectrum) (sample 2) obtained at room temperature.
Figure 29:
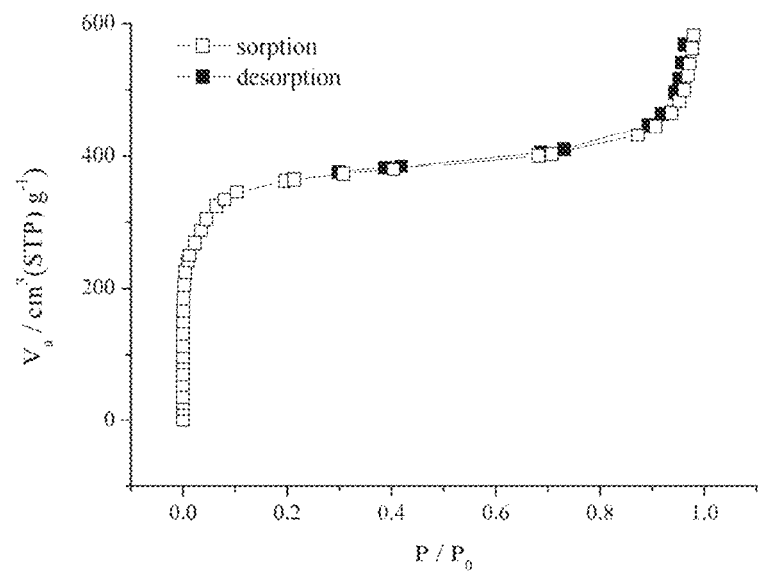
FIG. 29 shows $N_2$ adsorption (empty squarres) and desorption (black squarres) isotherms of MIL-100(Fe/Ru) nanoparticles prepared according to Example 5 (sample 2) at 77 K. Activation was performed by outgassing at 150° C. for 3 h.

The structure of mixed-metal nanoMOFs samples 1-5 was ascertained by X-ray diffraction (XRD) and FT-IR analysis to verify the appropriate formation of the MIL-100 nanoMOF material, FIGS. 27 and 28, respectively.

FIG. 28 displays the FTIR spectra for MIL-100(Fe) and MIL-100(Fe/Ru) nanoparticles obtained at room temperature. The characteristic bands assigned to MIL-100(Fe) structure (u(C═O) carboxylate at 1577 and 1450 cm-1) are observed together with the band of the free trimesic acid band (u(C═O) carboxylate at 1700 cm-1) corresponding to the excess of ligand non-coordinated.

Once the structure was confirmed, an estimation of the metal content in the heterometallic nanoMOFs was carried out by means of EDX analysis and the results are depicted in Table 2. As expected, the Ru content was modified from 1 to 26% (atomic %) from samples 1 to 5 by modifying the Fe/Ru metal ratio in the initial reaction mixture.

Additional studies to characterise more in detail the nanoparticles included dynamic light scattering (DLS), Energy-dispersive X-ray spectroscopy (EDX), N$_2$ adsorption-desorption isotherms and thermogravimetric analyses (TGA). Analysis of the particle size by dynamic light scattering (DLS) was performed for all mixed-metal nanoparticles and calculated under ISO standard 13321:1996 E and ISO 22412:2008. Table 2 summarizes the particle average size distribution obtained in the different MIL-100(Fe/Ru) nanoparticles (samples 1-5) suspended in water affording a mean size distribution, which varies from 227 to 120 nm, depending on the metal content. All data was collected with a polydispersity index (PI)<0.3.

TABLE 2

Average size distribution as obtained by DLS measurements at room temperature and metal content by EDX analysis.

| Sample MIL-100(Fe/Ru) | Avg particle diameter (nm) | at % EDX based % Ru | at % EDX based % Fe |
|---|---|---|---|
| 1 | 192 ± 23 | 1.1 | 98.9 |
| 2 | 227 ± 25 | 4.7 | 95.3 |
| 3 | 210 ± 35 | 7.6 | 92.4 |
| 4 | 164 ± 37 | 10.0 | 90.0 |
| 5 | 120 ± 20 | 25.6 | 74.6 |

N$_2$ adsorption isotherm was measured for sample 2 to corroborate the preservation of the porous structure in the mixed-metal nanoMOF. MIL-100(Fe/Ru) nanoparticles (sample 2) exhibited the typical sorption/desorption profile expected for mesoporous MIL-100(Fe) nanoparticles, with a calculated BET surface area value of 1330 m$^2$·g$^{-1}$. In this line, thermo-gravimetric analysis (TGA) experiments were carried out to confirm the possible presence of excess of ligand partially occupying the pores.

TABLE 3

TGA of MIL-100(Fe) nanoparticles and MIL-100(Fe/Ru) nanoparticles (sample 2).

| Sample MIL-100(Fe) | | Organic mass w/w % | Inorganic mass w/w % |
|---|---|---|---|
| MIL-100(Fe) | theoretical value | 62.2 | 36.2 |
| | as-synthesized | 68.7 | 31.3 |
| 2_MIL-100(Fe/Ru) | as-synthesized | 67.5 | 32.5 |

Overall, the results confirm the formation of mesoporous MIL-100(Fe/Ru) nanoparticles in the absence of metal oxides. Importantly, the undesired formation of metal oxides, which is a characteristic limitation in the synthesis under reflux, is finally surpassed following the low temperature methodology according to the invention.

Example 6—Room Temperature Synthesis in Water of New Fe/1,2,4,5-Benzene Tetracarboxylic Based MOF as Nanoparticles 5 to 10 mmol of 1,2,4,5-Benzene Tetracarboxilic acid and 5 to 10 mmol of Iron(III) chloride anhydrous were introduced in a 100 mL vial (M/L ratio equals to 1). 50 mL of DI water were then added and the mixture was stirred for 16 h to 48 h using a magnetic stirrer at a temperature ranging from 4 to 30° C. The brown mixture was then centrifuged at 14500 RPM for 10 to 15 min to obtain a brown solid which was rinsed with water and dried at room temperature.

Figure 30:
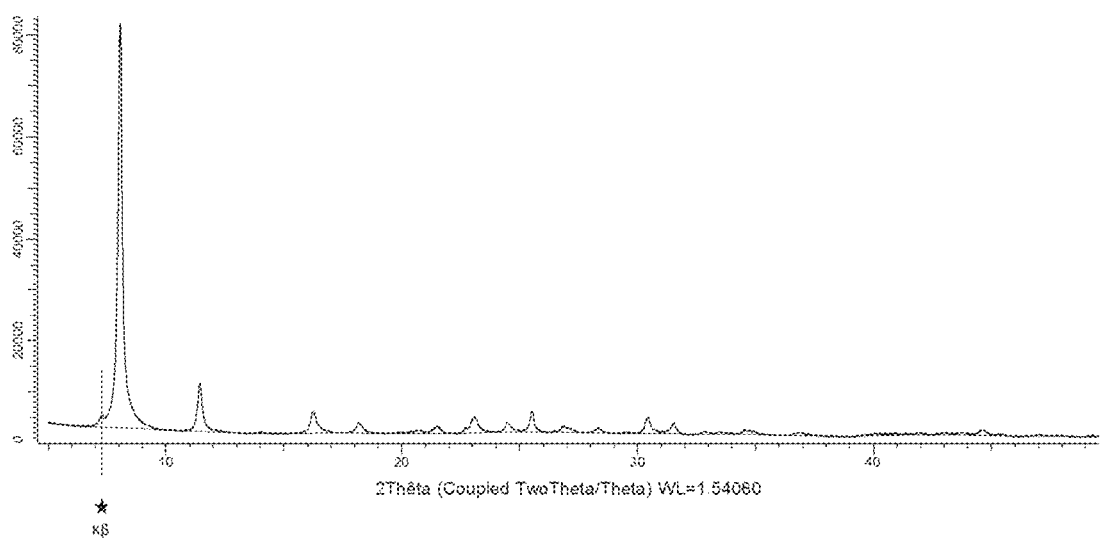
FIG. 30 shows a powder X-ray diffraction (PXRD) pattern of the new Fe/BTeC MOF prepared according to Example 6 performed at RT (Copper source with $K\alpha1$, $K\alpha2$ and a small fraction of Kβ as indicated).

PXRD of the material shows very broad peaks indicating small particle which is confirmed by SEM images. Particles of Fe/BTeC have a nano needle shape with dimensions of 100-200*50*50 nm (FIG. 30).

Nitrogen adsorption performed at 77K indicates a type I isotherm, indicating a microporous material, with a specific surface area (BET) around 940 m$^2$/g with a sample activated at 110° C. for 16 h (FIG. 32).

Figure 33:
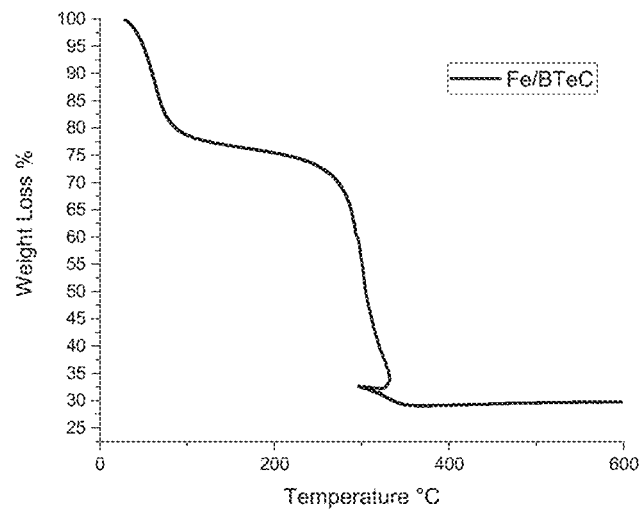
FIG. 33 shows a thermal gravimetric analysis plot of the new Fe/BTeC MOF prepared according to Example 6, showing water loss from 25° C. to 100° C. and the degradation of the MOF from 250° C.

Thermogravimetric analysis (performed under O$_2$ at 2° C./min) brings out two weight losses: the first one from 25° C. to 100° C. corresponds to the loss of water trapped in the micropores; the second weight loss shows the degradation of the MOF starting from 250° C. and complete at 350° C. From this second weight loss, we can estimate the ratio between the Fe and the BTeC ligand which we estimate close to two Fe for one ligand (FIG. 33).

Figure 34:
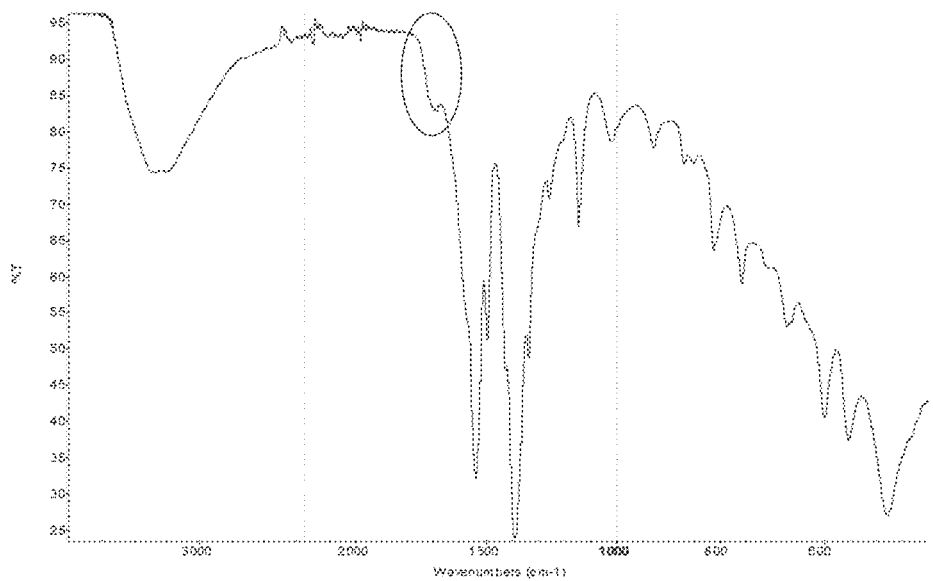
FIG. 34 shows an FT-IR spectrum of the new Fe/BTeC MOF prepared according to Example 6, showing typical bands of Fe_COO— (1550 cm-1) and also the pending free —COOH (highlighted by a circle on the figure).

FT-IR analysis shows the presence of carboxylate bonded to Fe and also the presence of —COOH groups coming from one or two uncoordinated —COOH of the BTeC ligand. This band at 1700 cm-1 might also indicate the presence of free BTeC ligand in the pores but the formation of anhydride upon heating (>130° C.) eliminates this hypothesis (FIG. 34).

Figure 35:
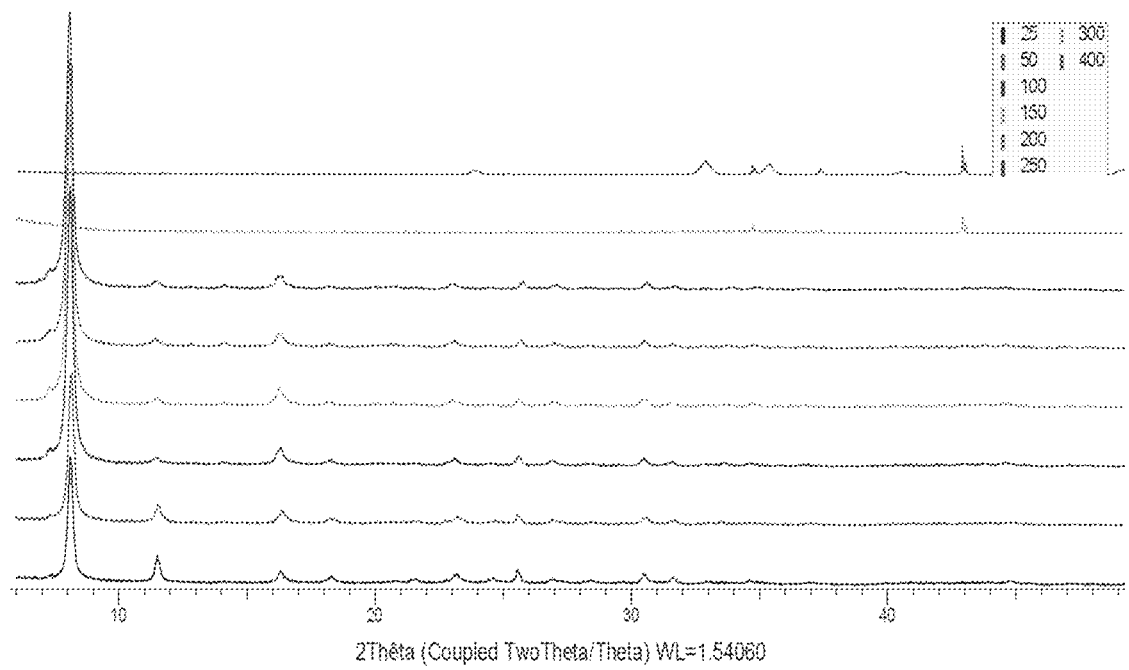
FIG. 35 shows temperature-dependent XRD of the new Fe/BTeC MOF prepared according to Example 6 performed at ambient temperature and pressure, from 25° C. to 400° C. Temperatures from top to bottom: 400° C., 300° C., 250° C., 200° C., 150° C., 100° C., 50° C., 25° C.

Temperature-dependent PXRD allowed to study the flexibility of the framework. As it can be seen on FIG. 35, there is no shift of the different peaks upon heating indicating a rigid framework. As shown by the TGA, degradation of the MOF appears at temperature higher than 250° C. (FIG. 33).

Figure 36:
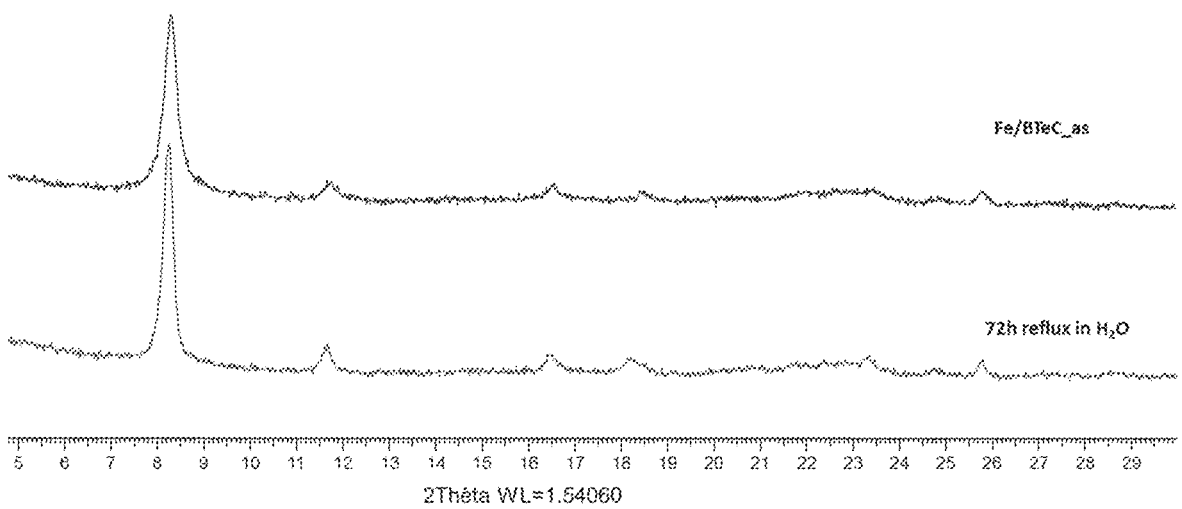
FIG. 36 shows powder X-ray diffraction (PXRD) patterns of the new Fe/BTeC MOF prepared according to Example 6 before (top) and after (bottom) the hydrothermal stability test (72 h in reflux $H_2O$).
Figure 37:
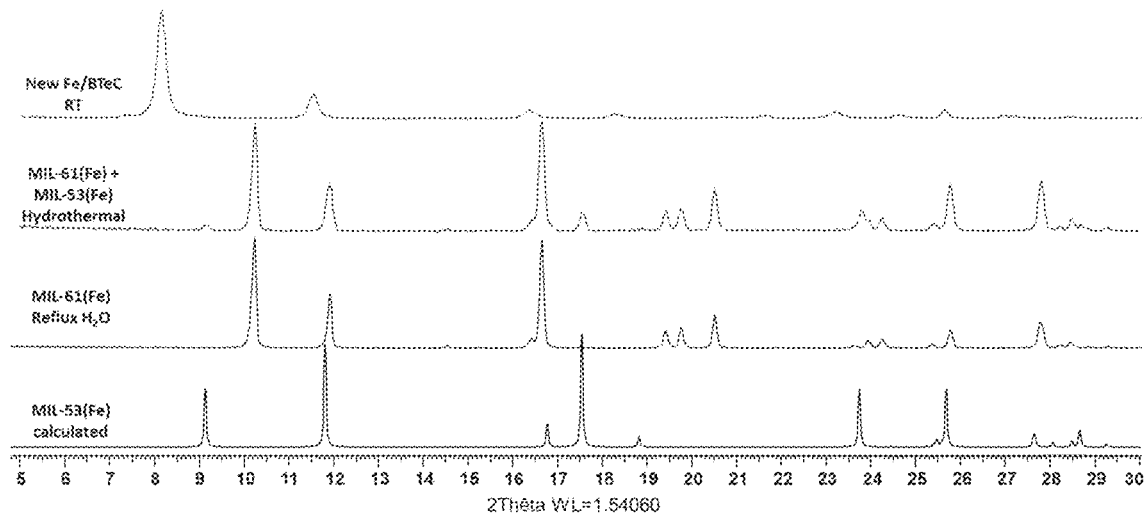
FIG. 37 shows different MOF carboxylate phases obtained in the same conditions safe temperature; from top to bottom: RT, Hydrothermal and Reflux synthesis.

Fe/BTeC is then thermally stable under ambient conditions but it is also the case under hydrothermal treatment. Several mg of Fe/BTeC are dispersed in H$_2$O and heated up to reflux. After 72 h, no degradation of the MOF appears as shown by the PXRD before and after the water stability treatment (FIG. 36).

Effect of Temperature on Synthesis

Synthesis conditions described above produce Fe/BTeC nanoparticles at temperature ranging from 4 to 40° C. When increasing the temperature, other known phases are obtained. For example, reflux synthesis in water yields pure MIL-61(Fe) which its Ga analogue has been described. Increasing the temperature even higher with hydrothermal conditions (150° C./24 h), we obtain the MIL-61(Fe) but we also notice the apparition of an additional phase, corresponding to MIL-53(Fe)—BTeC.

The latter belongs to the MIL-53 series with two free —COOH pending in the framework preventing the breathing effect.

Using the same reactants, in the same proportions and with the same solvent we obtain multiple phases depending on the temperature of the synthesis. The Fe/BTeC MOF has never been observed in any synthesis which temperature exceeds 40° C.

The crystal structure of this new Fe/BTeC MOF can be determined with high resolution powder X-ray diffraction data assisted by DFT calculation. As an exemplary protocol: the Fe/BTeC MOF sample is grinded into fine powder and sealed in glass capillaries with inner diameters of 0.3 mm or 0.7 mm. PXRD pattern of Fe/BTeC is collected on a Bruker D8 diffractometer at room temperature for 72 hours in a 2θ range from 5-50° (step size of 0.01).

TGA

Thermogravimetric analyses were carried out with a Mettler Toledo TGA/DSC 1, STAR System apparatus under an O$_2$ flow of 50 mL/min, at a heating rate of 3° C./min to 600° C., unless otherwise indicated.

Temperature-Dependent X-Ray Powder Diffraction

X-ray temperature dependent diffraction experiment was performed on a Bruker-D8 Advance diffractometer equipped with a HTK-1200N (Anton Parr) high-temperature chamber furnace and a LYNXEYE XE detector (with Cu-Kα radiation). PXRD patterns were collected every 25° C. from room temperature to 400° C.

Infrared Spectroscopy (IR)

IR spectra were measured with a Nicolet 6700 FTIR thermoscientific spectrometer between 400 and 4000 cm$^{-1}$.

Scanning Electron Microscopy (SEM)

SEM images were taken with a JEOL JSM-7001F microscope using gold coated samples.

Nitrogen Porosimetry

Nitrogen adsorption measurements were performed with BEL Japan Belsorp Mini and Maxi apparatus at 77 K after the sample being fully activated (BEL Japan, BELSORP Prep). The MOF samples were directly activated thermally under vacuum before the nitrogen adsorption at 77K were carried out.

Example 7—Room Temperature Synthesis in Water of Al-Based MOF as Nanoparticles 5 mmol of 1,2,4,5-Benzene Tetracarboxilic acid and 5 mmol of Aluminum(III) chloride anhydrous are introduced in a 100 mL round bottom flask. 50 mL of DI water is added and the mixture is stirred at 300 rpm for 48 hours at temperatures ranging from 20° C. to 60° C. The nanoparticle are recovered, washed with water and dried at room temperature.

Example 8—Room Temperature Synthesis in Water of Ti-Based MOF as Nanoparticles 10 mmol of 1,2,4,5-Benzene Tetracarboxilic acid and 10 mmol of Titanium(IV) oxide bis (2,4-pentanedionate) are introduced in a 100 mL round bottom flask. 50 mL of DI water is added and the mixture is stirred at 300 rpm for 48 hours at temperatures ranging from 20° C. to 60° C. The nanoparticle are recovered, washed with water and dried at room temperature.

Example 9—Room Temperature Synthesis in Water of New Fe/1,2,4-Benzene Tricarboxylic Based MOF (Fe/BTC) as Nanoparticles 1. Synthesis 5 to 10 mmol of 1,2,4-Benzene Tricarboxylic acid and 5 to 10 mmol of Iron(III) chloride anhydrous are introduced in a 100 mL vial (M/L ratio equals to 1); 50 mL of DI water are then added and the mixture is stirred for 72 h to 168 h using a magnetic stirrer at a temperature ranging from 4 to 30° C. The light-yellow mixture is then filtered to obtain a light-yellow solid (Fe/BTC) which is washed with water and dried at room temperature.

2. Characterization

Figure 39:
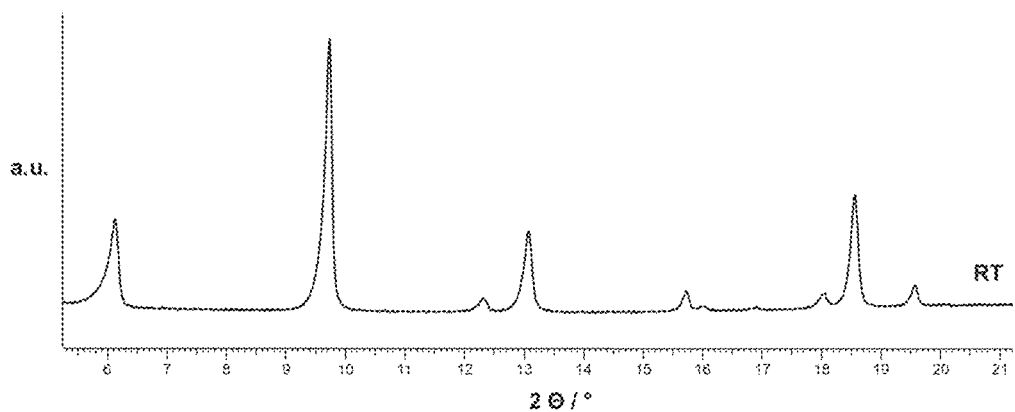
FIG. 39 shows a powder X-ray diffraction (PXRD) pattern of Fe/BTC prepared in Example 9, performed at room temperature (Copper source with $K_{\alpha1}$ and $K_{\alpha2}$).
Figure 40:
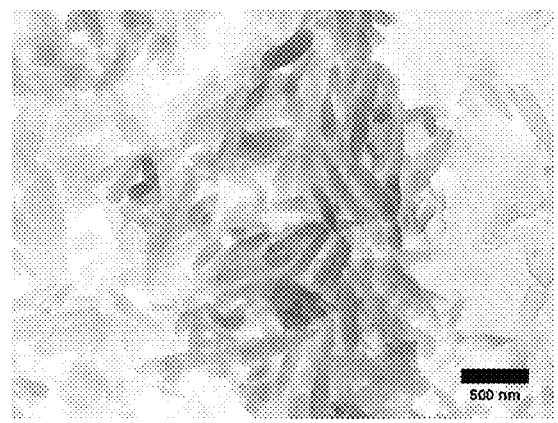
FIG. 40 shows an SEM image of Fe/BTC prepared in Example 9, showing needle-like particles with length below 1000 nm and height and with between 100 and 200 nm.

PXRD of the material shows very broad peaks indicating small particles (FIG. 39) which is confirmed by SEM images (FIG. 40). Particles of Fe/BTC have a nano needle shape with average dimensions of about 100*200*1000 nm.

Fe/BTC crystallizes in the orthorhombic crystal system and the cell parameters are gathered in Table 4. Fe/BTC is a porous coordination polymer made of 1D infinite chains of corner sharing Fe$^{3+}$ octahedra along the axis a. Each six-coordinate Fe$^{3+}$ is covalently linked to two oxygen atoms of bridging μ$_2$—OH groups and four oxygen atoms of 1,2,4-BTC linker.

TABLE 4

Crystallographic data of Fe/BTC.

| | Fe/BTC |
|---|---|
| Formula | Fe(OH)(1,2,4-BTC) |
| Crystal system | Orthorhombic |
| Space group | Pnma (62) |
| Lattice parameters | a = 6.9300(14) Å |
| | b = 28.420(6) Å |
| | c = 9.5600(19) Å |
| Volume | 1882.85 Å$^3$ |

Figure 41:
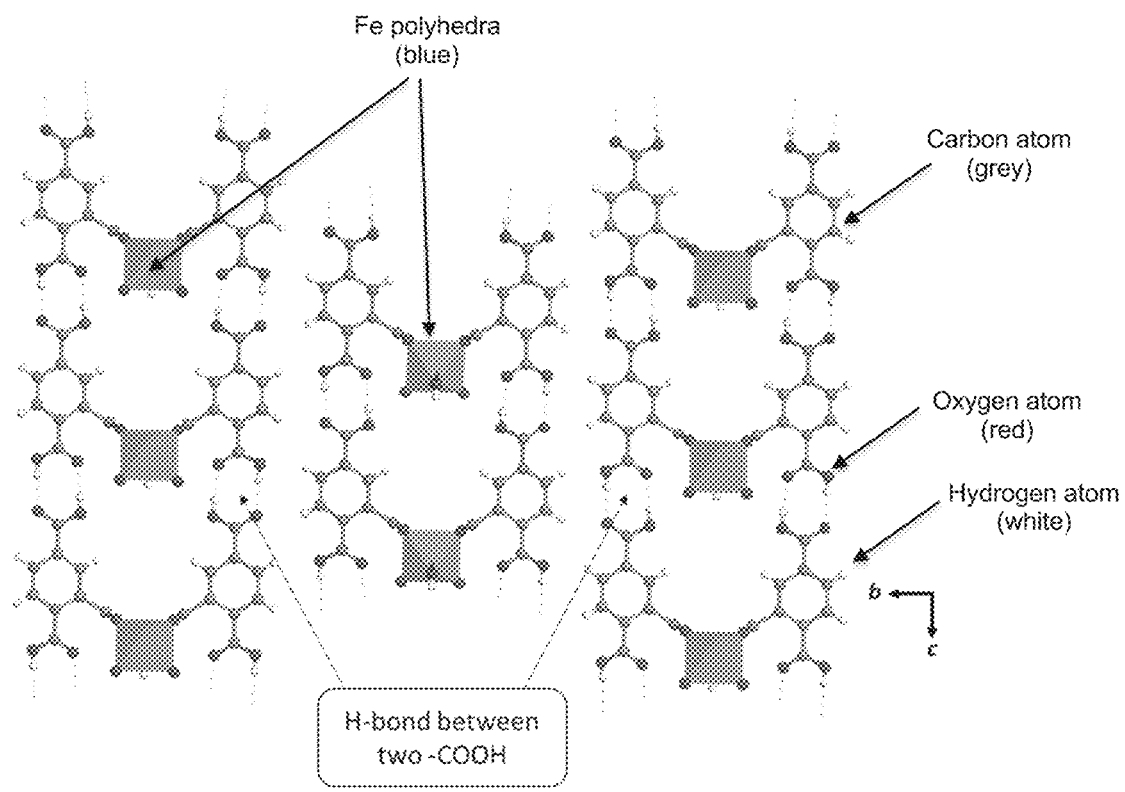
FIG. 41 is a schematic representation of one slice of Fe/BTC structure (prepared in Example 9) along the a axis showing the hydrogen bonds between facing —COOH groups holding the structure in the c direction. Fe polyhedra are in blue and carbon, oxygen and hydrogen are in grey, red and white, respectively.

Interestingly, only one carboxylic acid from the ligand is coordinated to two adjacent $Fe^{3+}$ that holds the 1 D chain together; the two others are free —COOH groups. Free —COOH groups from two different ligands are facing each other and thus create a network of strong hydrogen bonds that maintains the structure in the c direction (see FIG. 41). Finally, weak interactions hold the structure in the b direction. Remarkably, this structure possesses 1D very narrow channels following the a axis (along the Fe infinite chains). Dimensions of these channels are 2.5 Å*4.0 Å.

Figure 42:
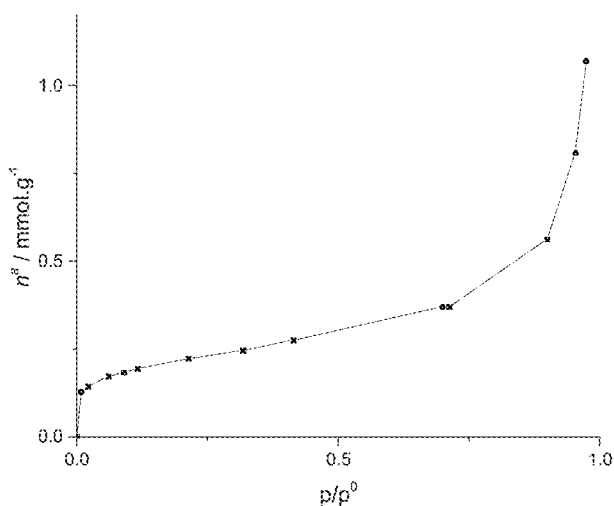
FIG. 42 shows $N_2$ adsorption of Fe/BTC prepared in Example 9, performed at 77K.

Nitrogen adsorption performed at 77K indicates a near type II isotherm, which is typical of a solid non-porous to $N_2$, with a specific surface area (BET) below 20 m$^2$/g with a sample activated at 120° C. for 16 h (FIG. 42).

Figure 43:
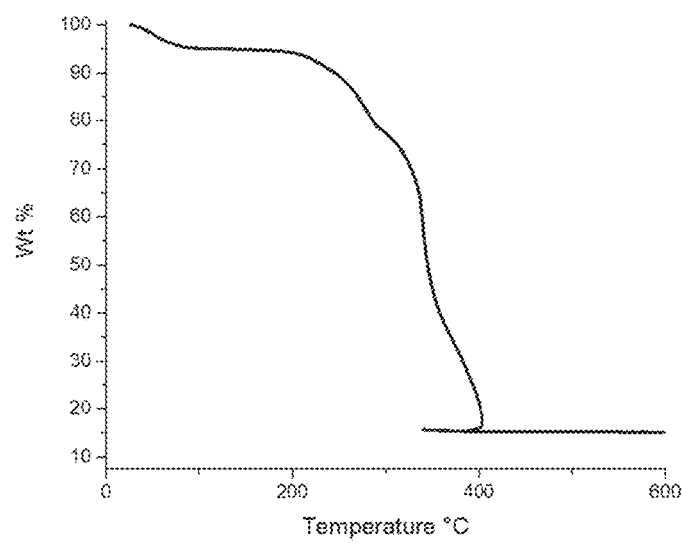
FIG. 43 represents a thermal gravimetric analysis (TGA) plot of Fe/BTC prepared in Example 9, showing water loss from 25° C. to 100° C. and the degradation of the MOF from 250° C.

Thermogravimetric analysis (performed under $O_2$ at 2° C./min) brings out two weight losses: the first one from 25° C. to 100° C. corresponds to the loss of water trapped in the micropores; the second weight loss shows the degradation of the MOF starting from 250° C. and complete at 400° C. (FIG. 43).

Figure 44:
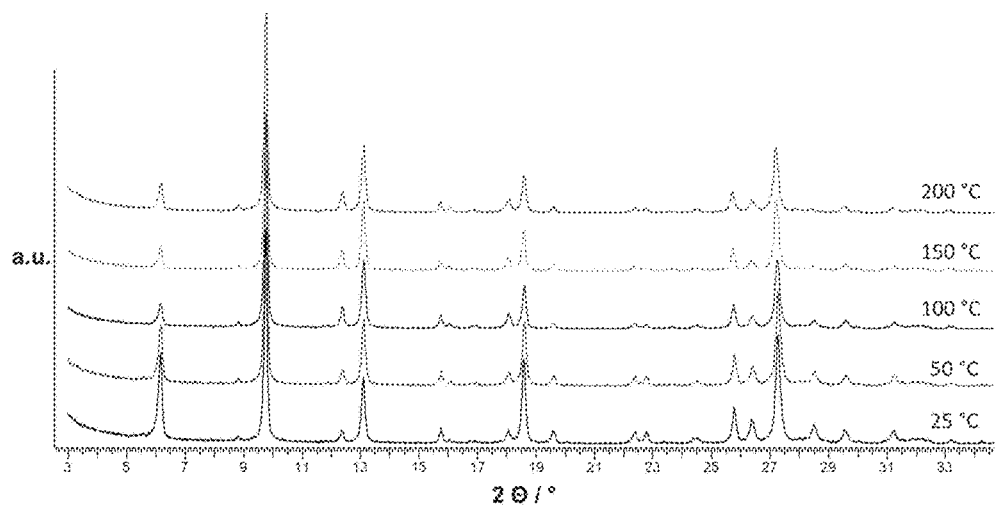
FIG. 44 represents temperature-dependent XRD of Fe/BTC prepared in Example 9 performed at ambient temperature and pressure, from 25° C. to 200° C.

Temperature-dependent PXRD allows us to study the flexibility of the framework. As it can be seen on FIG. 44, there is no shift of the different peaks upon heating indicating a rigid framework up to 200° C.

Figure 45:
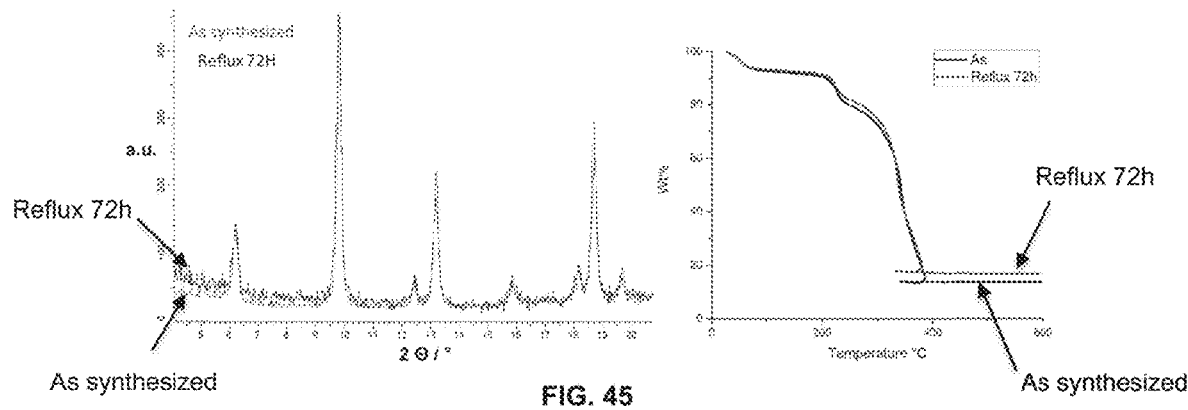
FIG. 45 represents PXRD and TGA of Fe/BTC prepared in Example 9 before and after the hydrothermal stability test (72 h in reflux $H_2O$).

Fe/BTC is then thermally stable under ambient conditions but it is also the case under hydrothermal treatment. Several mg of Fe/BTC are dispersed in $H_2O$ and heated up to reflux. After 72 h, almost no degradation of the MOF appears as shown by PXRD and TGA before and after the water stability treatment (FIG. 45).

3. Effect of Synthesis Conditions

Figure 46:
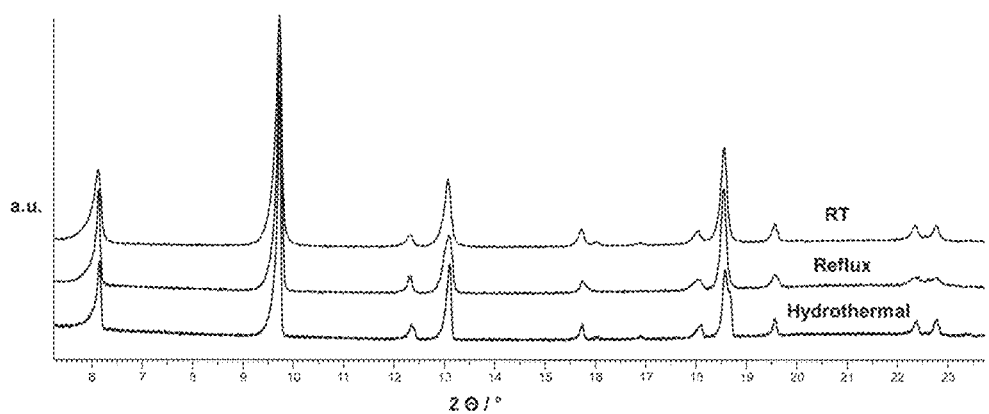
FIG. 46 represents comparative PXRD spectra of Fe/BTC obtained using different synthetic conditions: reflux, hydrothermal and room temperature syntheses, the room temperature synthesis being that reported in Example 9.

Fe/BTC MOF can also be obtained pure by reflux and hydrothermal syntheses but dimensions of resulting crystals differ depending on the synthesis conditions (PXRD in FIG. 46).

Figure 47A:
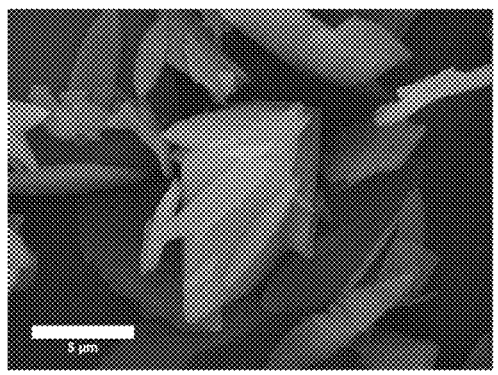
FIGS. 47A, 47B represent represents SEM images of Fe/BTC obtained by reflux (left) and hydrothermal (right)
Figure 47B:
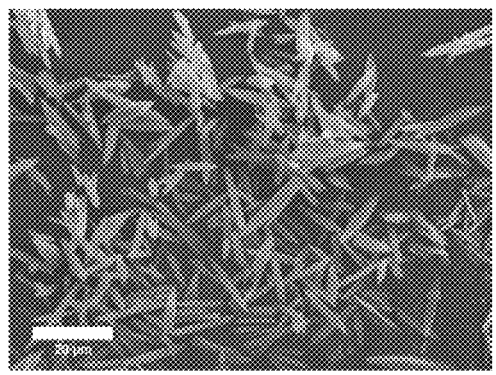

Room temperature conditions described above produce Fe/BTC nanoparticles at temperature ranging from 4 to 40° C. By using reflux conditions (100° C. in water), Fe/BTC particles obtained are much bigger (several microns) and polydisperse. Additionally, hydrothermal synthesis (200° C.) yielded even bigger crystals with length around 20 μm (FIGS. 47A, 47B).

Using the same reactants, in the same proportions and with the same solvent we obtained different sizes of crystals of Fe/BTC which shows the importance of temperature on the nucleation and growth of crystals. In this system, nanoparticles could only be obtained by room temperature synthesis.

While we have described a number of embodiments of this invention, it is apparent that our basic examples may be altered to provide other embodiments that utilize the Ti-based MOFs and methods of this invention. Therefore, it will be appreciated that the scope of this invention is to be defined by the appended claims rather than by the specific embodiments that have been represented by way of example.

LIST OF REFERENCES

[1] WO 2009/077670
[2] WO 2009/077671
[3] a) Shuai Yuan, Tian-Fu Liu, Dawei Feng, Jian Tian, Kecheng Wang, Junsheng Qin, Qiang Zhang, Ying-Pin Chen, Mathieu Bosch, Lanfang Zou, Simon J. Teat, Scott J. Dalgarnoc and Hong-Cai Zhou, Chem. Sci., 2015, 6, 3926-3930; b) Amarajothi Dhakshinamoorthy, Abdullah M. Asiri, and Hermenegildo Garcia, Angew. Chem. Int. Ed. 2016, 55, 5414-5445
[4] Yabing He, Wei Zhou, Guodong Qian and Banglin Chen, Chem. Soc. Rev., 2014, 43, 5657-5678
[5] Ben Van de Voorde, Bart Bueken, Joeri Denayer and Dirk De Vos, Chem. Soc. Rev., 2014, 43, 5766-5788
[6] a) Ha L. Nguyen, Felipe Gandara, Hiroyasu Furukawa, Tan L. H. Doan, Kyle E. Cordova, and Omar M. Yaghi, J. Am. Chem. Soc. 2016, 138, 4330-4333; b) Valentina G. Ponomareva, Konstantin A. Kovalenko, Alexei P. Chupakhin, Danil N. Dybtsev, Elena S. Shutova, and Vladimir P. Fedin, J. Am. Chem. Soc. 2012, 134, 15640-15643
[7] Vitalie Stavila, A. Alec Talin and Mark D. Allendorf, Chem. Soc. Rev., 2014, 43, 5994-6010
[8] Zhichao Hu, Benjamin J. Deibert and Jing Li, Chem. Soc. Rev., 2014, 43, 5815-5840
[9] Patricia Horcajada, Ruxandra Gref, Tarek Baati, Phoebe K. Allan, Guillaume Maurin, Patrick Couvreur, Gérard Férey, Russell E. Morris, and Christian Serre, Chem. Rev., 2012, 112, 1232-1268

The invention claimed is:

1. Nanoparticles of porous crystalline Fe-, Al- or Ti-based MOF carboxylate material having a polydispersity index 0.05≤PDI≤0.5, as calculated under ISO standard 13321: 1996 E and ISO 22412:2008; and an average size <90 nm.

2. A medicament comprising Nanoparticles according to claim 1 and a pharmaceutically active ingredient.

3. A medical imaging marker comprising Nanoparticles according to claim 1.

4. A catalyst support for carrying out heterogeneously catalyzed chemical reactions comprising nanoparticles according to claim 1.

5. A gas storage/separation/purification material comprising nanoparticles according to claim 1.

6. A matrix for encapsulating active pharmaceutically active principles or compounds of cosmetic interest comprising nanoparticles according to claim 1.

7. Nanoparticles according to claim 1, wherein the polydispersity index of the nanoparticles is 0.05≤PDI≤0.4, as calculated under ISO standard 13321:1996 E and ISO 22412:2008.

8. Nanoparticles according to claim 1, wherein the polydispersity index of the nanoparticles is 0.05≤PDI≤0.3, as calculated under ISO standard 13321:1996 E and ISO 22412:2008.

9. Nanoparticles according to claim 1, wherein the average size of the nanoparticles is <85 nm.

10. Nanoparticles according to claim 1, wherein the average size of the nanoparticles is <80 nm.

11. Nanoparticles according to claim 1, wherein the average size of the nanoparticles is <75 nm.

12. Nanoparticles according to claim 1, wherein the average size of the nanoparticles is <70 nm.

13. Nanoparticles according to claim 1, wherein the porous crystalline Fe-, Al- or Ti-based MOF carboxylate material is a crystalline Fe-based MOF carboxylate material.

14. Nanoparticles according to claim 1, wherein the porous crystalline Fe-, Al- or Ti-based MOF carboxylate material is a crystalline Al-based MOF carboxylate material.

15. Nanoparticles according to claim 1, wherein the porous crystalline Fe-, Al- or Ti-based MOF carboxylate material is a crystalline Ti-based MOF carboxylate material.

16. Nanoparticles according to claim 1, wherein the nanoparticles are doped with the Fe, Al or Ti present in the MOF framework but with a different oxidation state.

17. Nanoparticles according to claim 1, wherein the nanoparticles are doped with one or more metals different from the Fe, Al or Ti present in the MOF framework.

18. Nanoparticles according to claim 17, wherein the one or more metals different from the Fe, Al or Ti present in the MOF framework comprise Cu, Co, Ni, Al, Ti, Mn, V, Cr, Fe, Ru, Sn, Mg or Nb.

19. Nanoparticles according to claim 18, wherein the nanoparticles are doped with Ru.

20. Nanoparticles according to claim 13, wherein the nanoparticles are doped with Ru.

* * * * *